United States Patent
Katayose

(10) Patent No.: US 10,921,569 B2
(45) Date of Patent: Feb. 16, 2021

(54) ZOOM LENS AND IMAGE PICKUP APPARATUS

(71) Applicant: CANON KABUSHIKI KAISHA, Tokyo (JP)

(72) Inventor: Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 16/010,851

(22) Filed: Jun. 18, 2018

(65) Prior Publication Data
US 2018/0372993 A1 Dec. 27, 2018

(30) Foreign Application Priority Data
Jun. 21, 2017 (JP) .................... 2017-121092

(51) Int. Cl.
| | | |
|---|---|---|
| G02B 15/14 | (2006.01) | |
| G02B 21/02 | (2006.01) | |
| G02B 3/02 | (2006.01) | |
| G02B 13/02 | (2006.01) | |
| G02B 13/04 | (2006.01) | |
| G02B 9/62 | (2006.01) | |
| G02B 9/60 | (2006.01) | |
| G02B 13/00 | (2006.01) | |
| G02B 15/20 | (2006.01) | |
| G02B 15/173 | (2006.01) | |

(52) U.S. Cl.
CPC ........... *G02B 13/009* (2013.01); *G02B 13/02* (2013.01); *G02B 15/173* (2013.01); *G02B 15/20* (2013.01)

(58) Field of Classification Search
CPC . G02B 7/10; G02B 3/00; G02B 21/02; G02B 13/18; G02B 13/02; G02B 9/64; G02B 13/00; G02B 13/24; G02B 9/60
USPC ....... 359/695, 642, 658, 659, 657, 713, 714, 359/746, 750–753, 755–758, 763, 764
See application file for complete search history.

(56) References Cited

U.S. PATENT DOCUMENTS

| | | | |
|---|---|---|---|
| 2015/0138400 A1 | 5/2015 | Ito | |
| 2015/0219882 A1 | 8/2015 | Mogi | |
| 2017/0108676 A1* | 4/2017 | Hori | ........................ G02B 9/62 |
| 2018/0074300 A1* | 3/2018 | Gyoda | ..................... G02B 9/64 |

FOREIGN PATENT DOCUMENTS

| | | |
|---|---|---|
| JP | 2015099213 A | 5/2015 |
| JP | 2015145914 A | 8/2015 |
| JP | 2016048354 A | 4/2016 |

* cited by examiner

*Primary Examiner* — Dawayne Pinkney
(74) *Attorney, Agent, or Firm* — Carter, DeLuca & Farrell LLP

(57) ABSTRACT

Provided is a zoom lens including, in order from an object side to an image side: a positive first lens unit; a negative second lens unit; a positive third lens unit; a positive fourth lens unit; and a rear unit including at least one lens unit. An interval between each pair of adjacent lens units is changed during zooming. The first lens unit includes, in order from the object side to the image side, a negative lens and a positive lens. A focal length f1 of the first lens unit, a focal length f2 of the second lens unit, a focal length f3 of the third lens unit, and an average value Nd1ave of refractive indices at a d-line of respective materials of the negative lens and the positive lens of the first lens unit are each appropriately set.

14 Claims, 11 Drawing Sheets

ZOOM LENS AND IMAGE PICKUP APPARATUS

BACKGROUND OF THE INVENTION

Field of the Invention

The present invention relates to a zoom lens and an image pickup apparatus, which are suitable for an image pickup apparatus using an image pickup element, for example, a video camera, an electronic still camera, a broadcasting camera, or a monitoring camera.

Description of the Related Art

In recent years, an image pickup apparatus using an image pickup element has been sophisticated, and the entire apparatus has been downsized. An image pickup optical system for use in the image pickup apparatus is therefore required to be, for example, a zoom lens having a short total lens length, a compact (small) size, and high optical performance over the entire zoom range. As a zoom lens meeting those demands, there has been known a positive lead-type zoom lens in which a lens unit having a positive refractive power is arranged closest to an object side.

Hitherto, there has been known a zoom lens including, in order from an object side to an image side, a first lens unit having a positive refractive power, a second lens unit having a negative refractive power, a third lens unit having a positive refractive power, a fourth lens unit having a positive refractive power, and a rear unit including at least one lens unit subsequent thereto (US Patent Application Publication No. 2015/0219882, Japanese Patent Application Laid-Open No. 2016-048354, and US Patent Application Publication No. 2015/0138400). In US Patent Application Publication No. 2015/0219882, the rear unit consists of, in order from the object side to the image side, a fifth lens unit having a negative refractive power, and a sixth lens unit having a positive refractive power. In Japanese Patent Application Laid-Open No. 2016-048354, the rear unit consists of a fifth lens unit having a negative refractive power. In US Patent Application Publication No. 2015/0138400, the rear unit consists of a fifth lens unit having a positive refractive power.

In order to reduce the thickness of the image pickup apparatus when an image is not taken, many image pickup apparatus employ a so-called retractable lens system in which a lens barrel is divided into several stages so that each lens unit forming the zoom lens can be retracted and accommodated in an optical axis direction. In the retractable lens system, the thickness of each lens unit greatly affects the thickness of the image pickup apparatus at the time when the lens barrel is retracted. In particular, a zoom lens having a large aperture diameter has a large lens effective diameter, and each lens unit tends to be thick.

Therefore, it is difficult to thin the image pickup apparatus. In order to effectively thin the image pickup apparatus, the number of lenses forming the zoom lens may be reduced. Further, in order to reduce the total lens length and the lens effective diameter of the zoom lens, a refractive power of each lens unit forming the zoom lens may be increased.

However, when the refractive power of each lens unit is increased while the number of lenses is reduced, a variety of large aberrations are caused, and it becomes difficult to maintain high optical performance over the entire zoom range. Particularly at a telephoto end, chromatic aberrations such as an axial chromatic aberration and a lateral chromatic aberration are likely to be frequently generated. In the positive lead-type zoom lens, in many cases, those chromatic aberrations are generated by the first lens unit having a positive refractive power.

Therefore, in order to satisfactorily correct the axial chromatic aberration and the lateral chromatic aberration in the positive lead-type zoom lens, the positive refractive power of the first lens unit is required to be decreased. However, when the positive refractive power of the first lens unit is decreased too much, and a focal length at the telephoto end is increased, an amount of movement of the first lens unit during zooming is increased, and the total lens length and the lens effective diameter are thus increased. Therefore, in order to downsize the zoom lens while satisfactorily correcting the aberrations, it is required to appropriately set, for example, a lens configuration of the first lens unit, a material to be used, and a refractive power of each lens unit.

In particular, in order to obtain high optical performance over the entire zoom range while downsizing the entire system of the zoom lens and thinning the apparatus in the optical axis direction when the lens barrel is retracted, it is required to appropriately set, for example, a zoom type, a refractive power of each lens unit, a lens configuration of each lens unit, and a movement locus of each lens unit during zooming.

SUMMARY OF THE INVENTION

According to one embodiment of the present invention, there is provided a zoom lens including, in order from an object side to an image side: a first lens unit having a positive refractive power; a second lens unit having a negative refractive power; a third lens unit having a positive refractive power; a fourth lens unit having a positive refractive power; and a rear unit including at least one lens unit, wherein an interval between each pair of adjacent lens units is changed during zooming, wherein the first lens unit includes, in order from the object side to the image side, a negative lens and a positive lens, and wherein the following conditional expressions are satisfied:

$$-7.5 < f1/f2 < -4.8;$$

$$-4.0 < f3/f2 < -1.8; \text{ and}$$

$$1.86 < Nd1\text{ave} < 2.10,$$

where f1 represents a focal length of the first lens unit, f2 represents a focal length of the second lens unit, f3 represents a focal length of the third lens unit, and Nd1ave represents an average value of refractive indices at a d-line of respective materials of the negative lens and the positive lens.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, exemplary embodiments of the present invention are described with reference to the attached drawings. A zoom lens according to one embodiment of the present invention includes, in order from an object side to an image side: a first lens unit having a positive refractive power; a second lens unit having a negative refractive power; a third lens unit having a positive refractive power; a fourth lens unit having a positive refractive power; and a rear unit including at least one lens unit. Intervals between adjacent lens units are changed during zooming.

Figure 1:
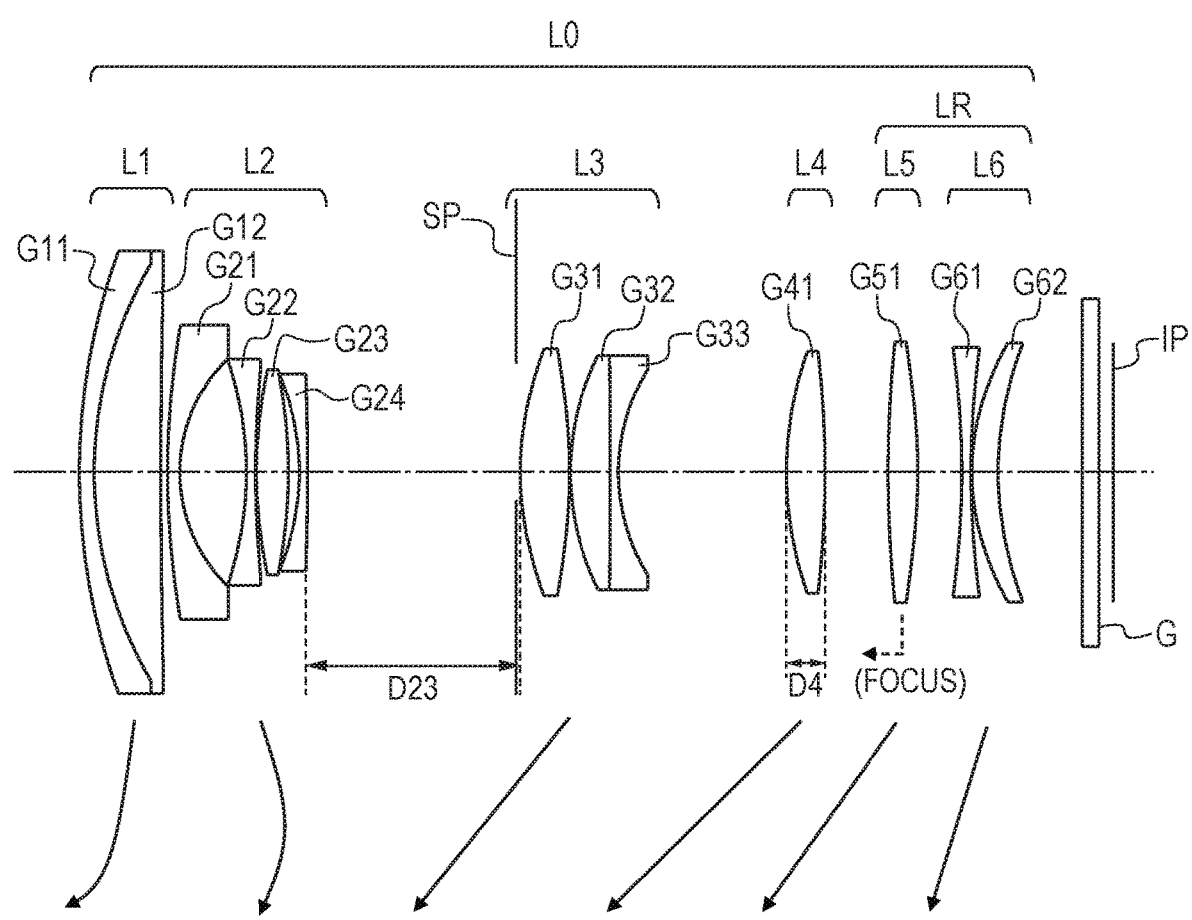
FIG. 1 is a lens cross-sectional view of a zoom lens according to Example 1 of the present invention at a wide angle end.
Figure 2A:
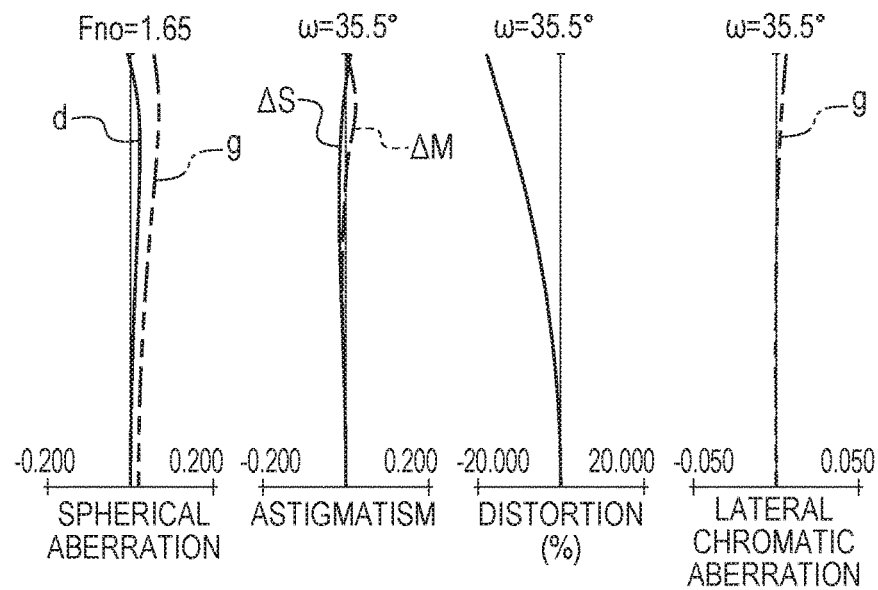
FIG. 2A is aberration diagrams of the zoom lens according to Example 1 at the wide angle end.
Figure 2B:
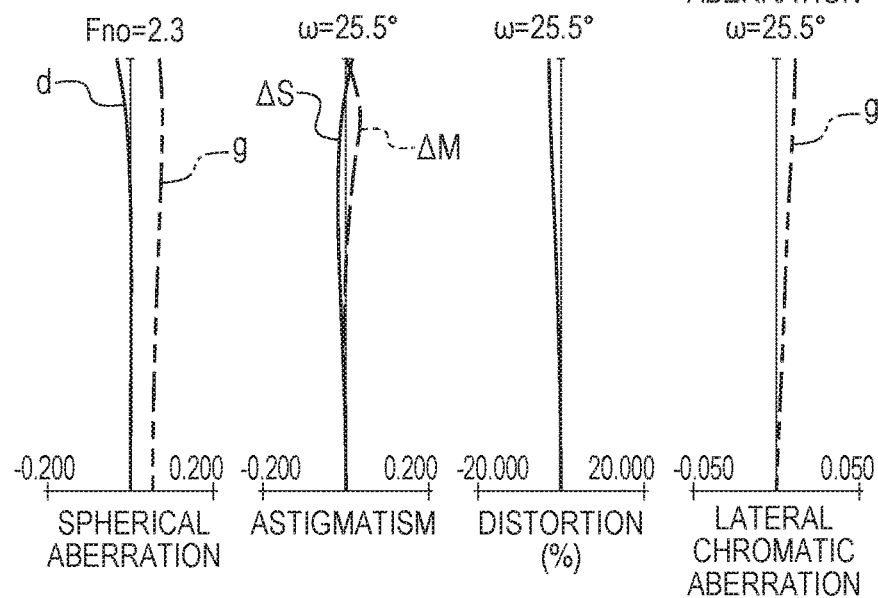
FIG. 2B is aberration diagrams of the zoom lens according to Example 1 at an intermediate position.
Figure 2C:
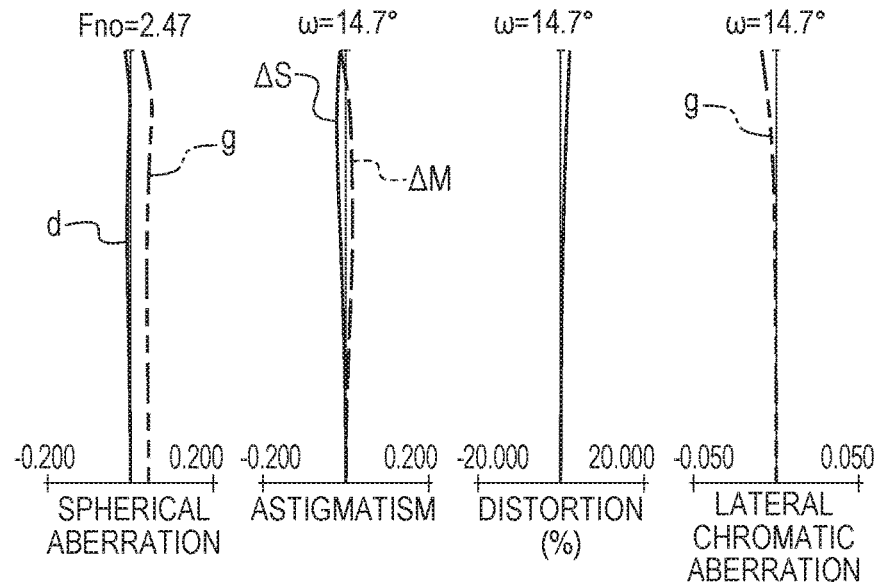
FIG. 2C is aberration diagrams of the zoom lens according to Example 1 at a telephoto end.

FIG. 1 is a lens cross-sectional view of a zoom lens according to Example 1 of the present invention at a wide angle end. FIG. 2A, FIG. 2B, and FIG. 2C are aberration diagrams of the zoom lens according to Example 1 at the wide angle end, at an intermediate zoom position, and at a telephoto end, respectively. Example 1 represents a zoom lens having a zoom ratio of 3.32 and an F-number of from 1.65 to 2.47.

Figure 3:
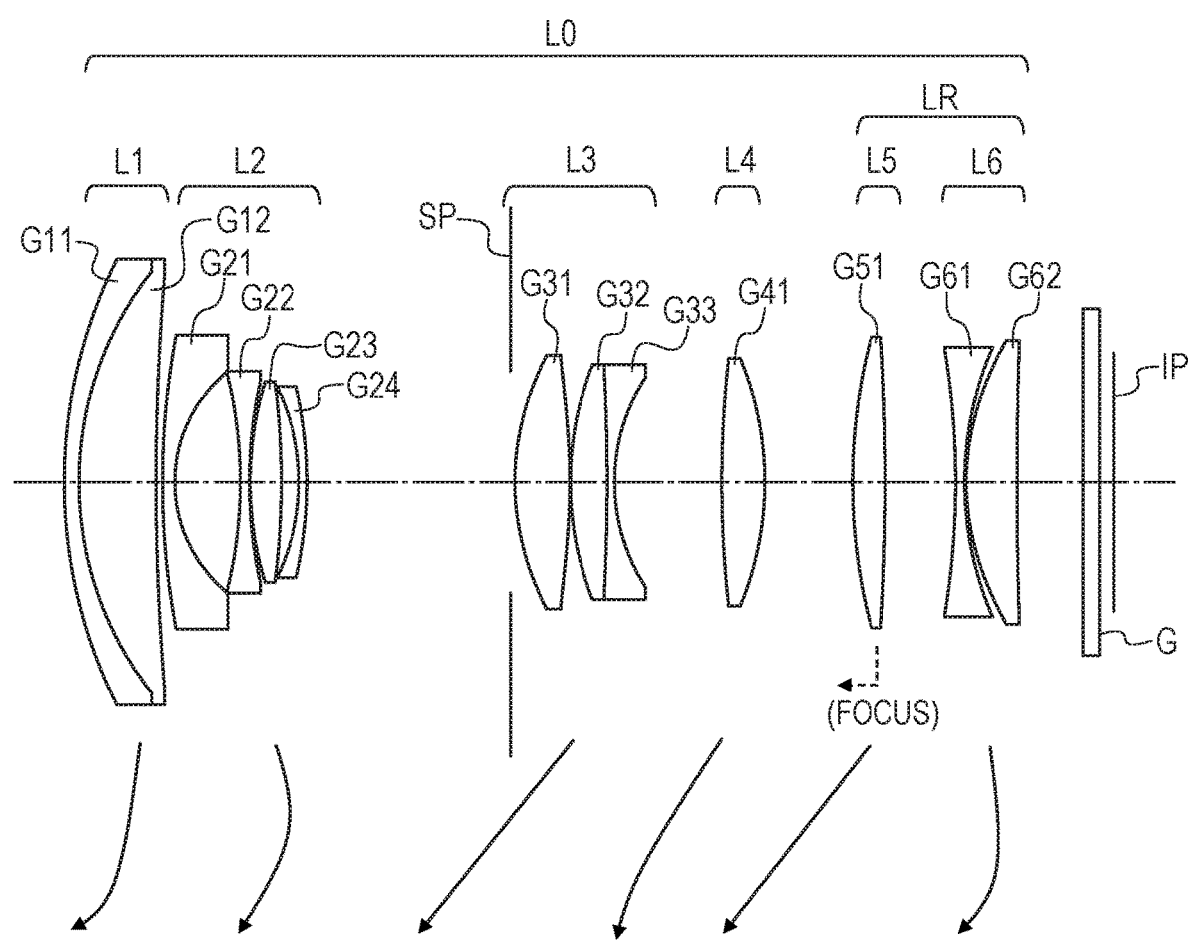
FIG. 3 is a lens cross-sectional view of a zoom lens according to Example 2 of the present invention at a wide angle end.
Figure 4A:
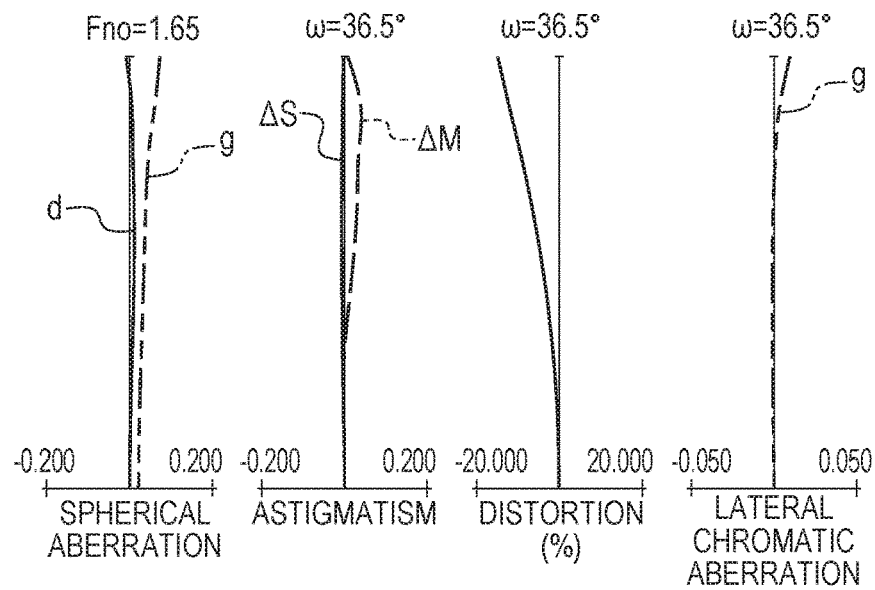
FIG. 4A is aberration diagrams of the zoom lens according to Example 2 at the wide angle end.
Figure 4B:
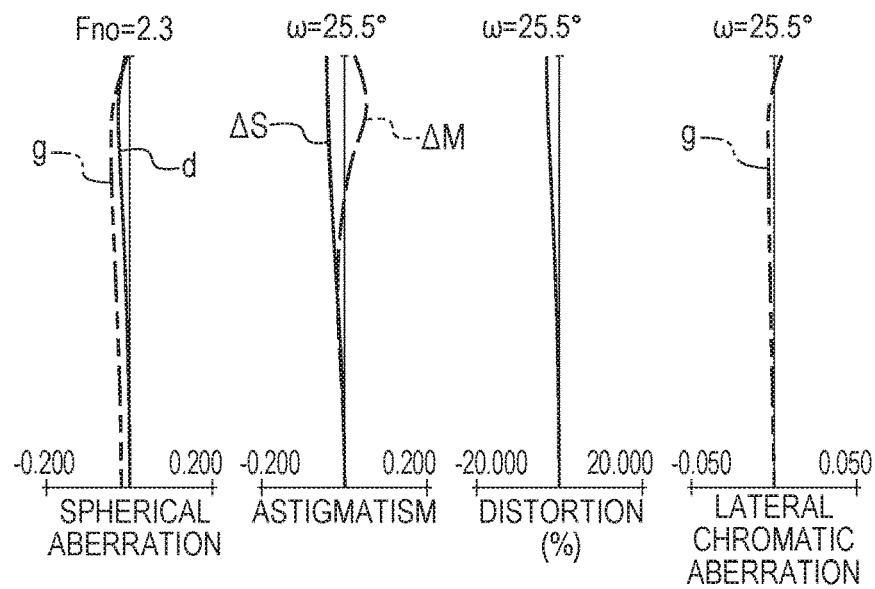
FIG. 4B is aberration diagrams of the zoom lens according to Example 2 at an intermediate position.
Figure 4C:
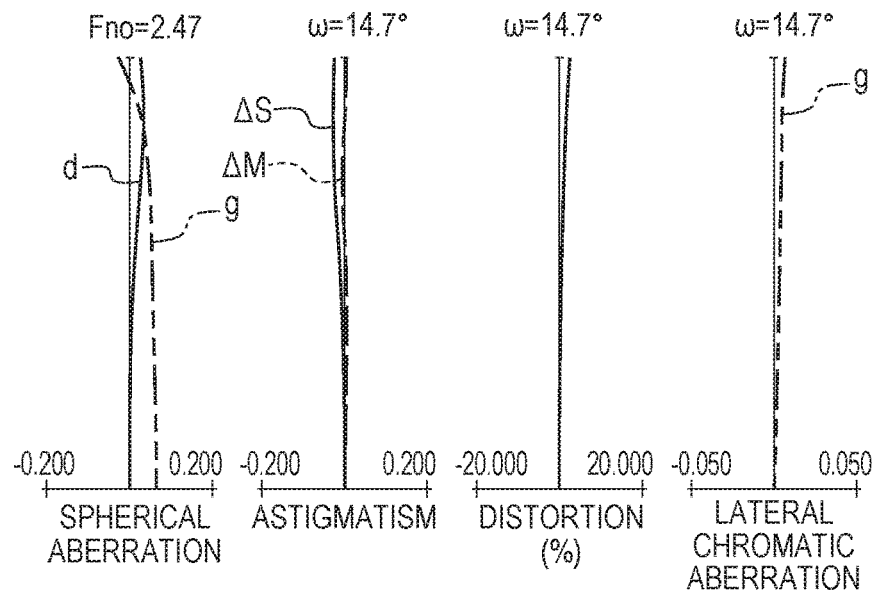
FIG. 4C is aberration diagrams of the zoom lens according to Example 2 at a telephoto end.

FIG. 3 is a lens cross-sectional view of a zoom lens according to Example 2 of the present invention at a wide angle end. FIG. 4A, FIG. 4B, and FIG. 4C are aberration diagrams of the zoom lens according to Example 2 at the wide angle end, at an intermediate zoom position, and at a telephoto end, respectively. Example 2 represents a zoom lens having a zoom ratio of 3.32 and an F-number of from 1.65 to 2.47.

Figure 5:
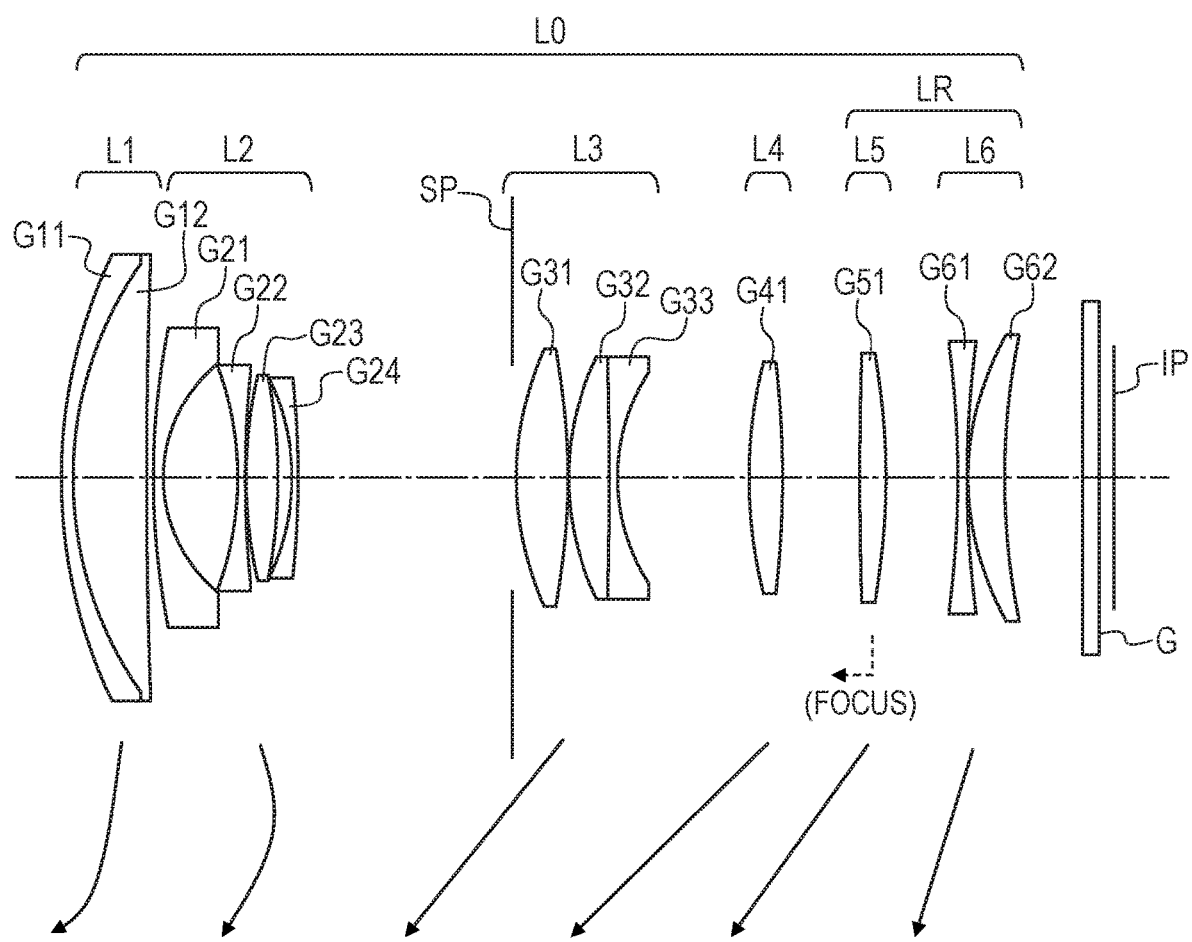
FIG. 5 is a lens cross-sectional view of a zoom lens according to Example 3 of the present invention at a wide angle end.
Figure 6A:
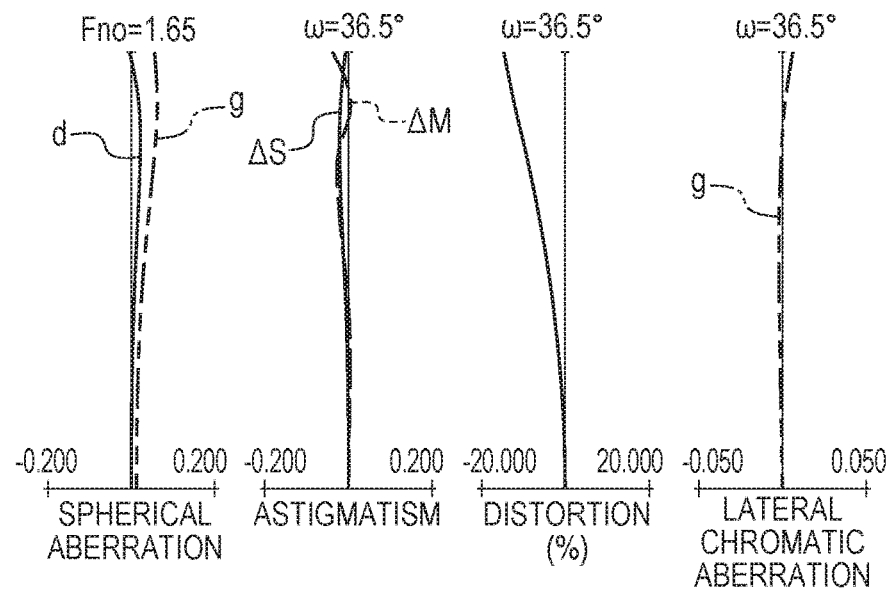
FIG. 6A is aberration diagrams of the zoom lens according to Example 3 at the wide angle end.
Figure 6B:
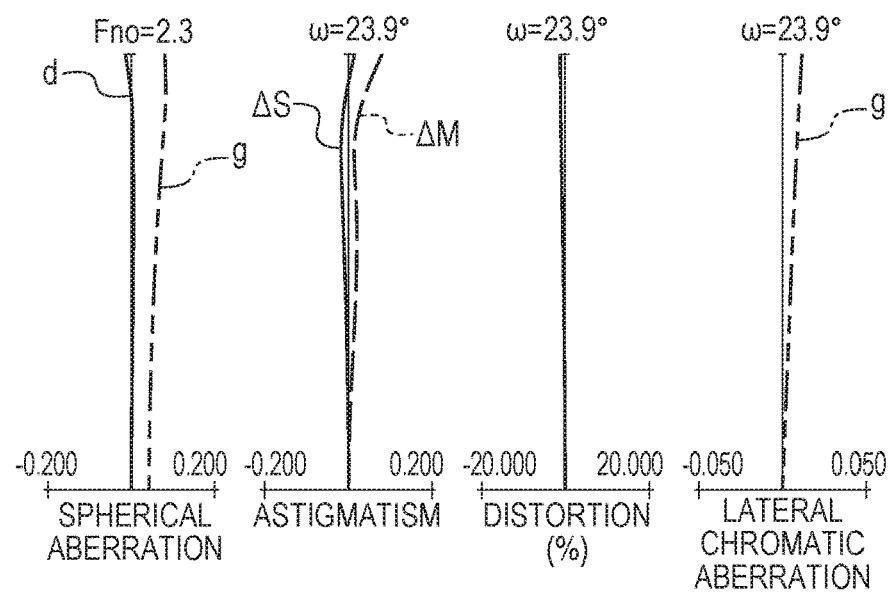
FIG. 6B is aberration diagrams of the zoom lens according to Example 3 at an intermediate position.
Figure 6C:
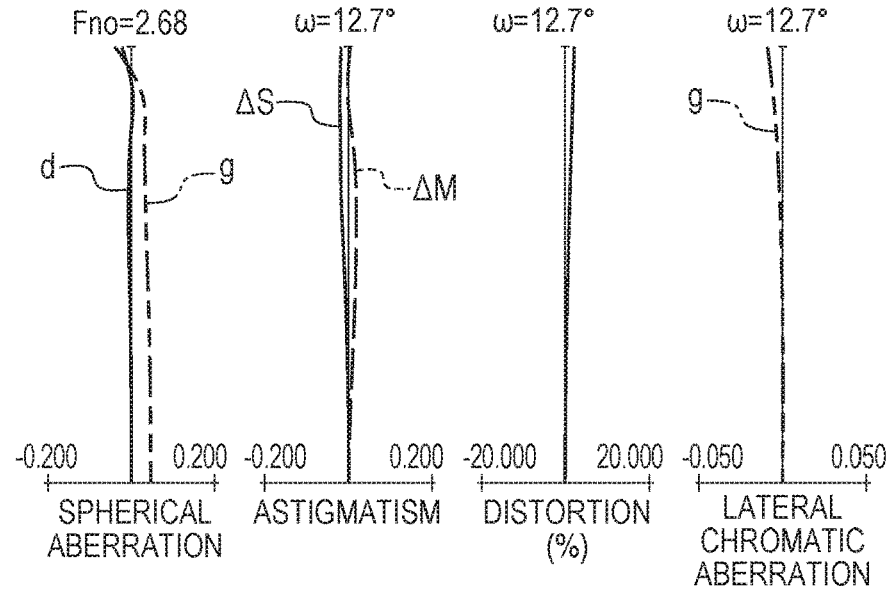
FIG. 6C is aberration diagrams of the zoom lens according to Example 3 at a telephoto end.

FIG. 5 is a lens cross-sectional view of a zoom lens according to Example 3 of the present invention at a wide angle end. FIG. 6A, FIG. 6B, and FIG. 6C are aberration diagrams of the zoom lens according to Example 3 at the wide angle end, at an intermediate zoom position, and at a telephoto end, respectively. Example 3 represents a zoom lens having a zoom ratio of 3.86 and an F-number of from 1.65 to 2.68.

Figure 7:
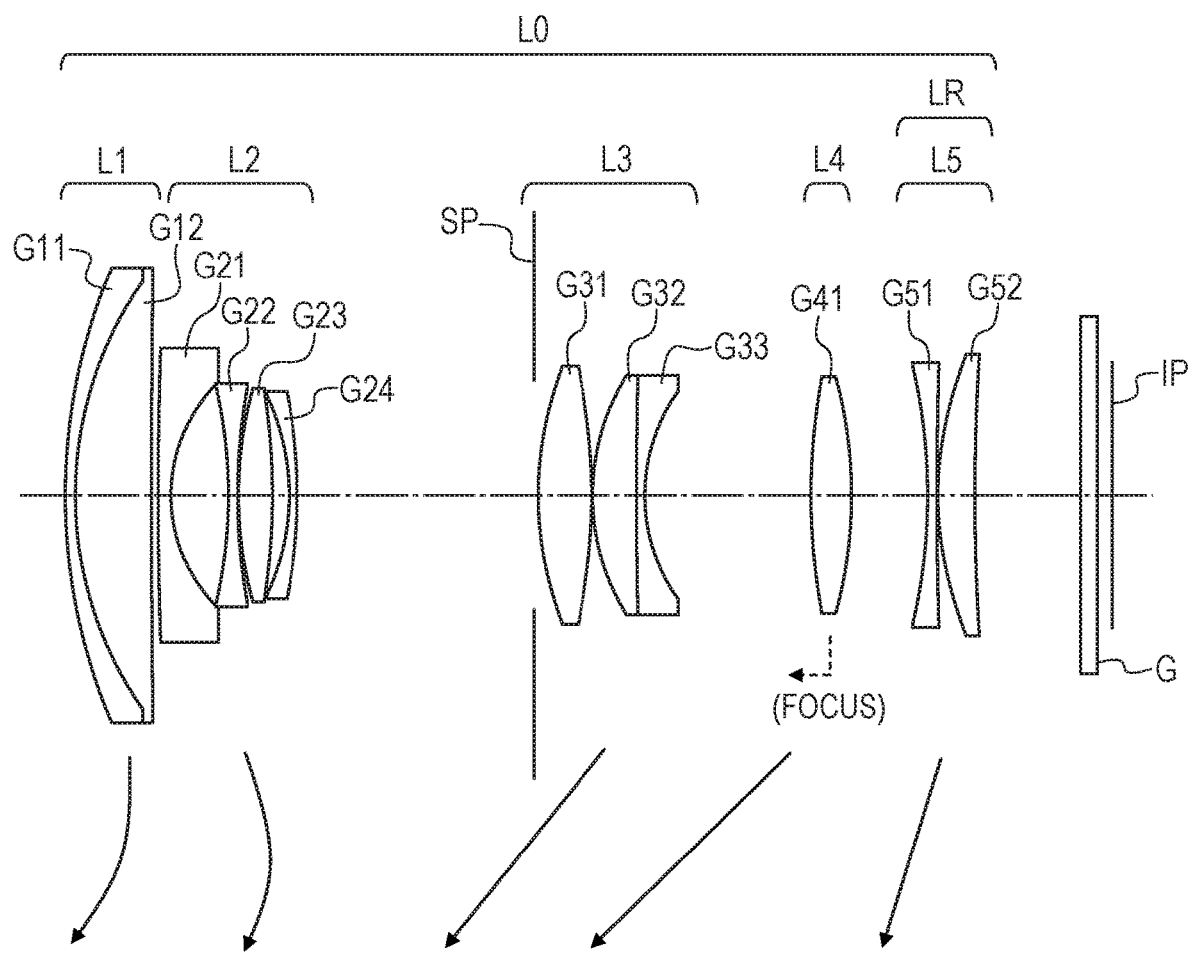
FIG. 7 is a lens cross-sectional view of a zoom lens according to Example 4 of the present invention at a wide angle end.
Figure 8A:
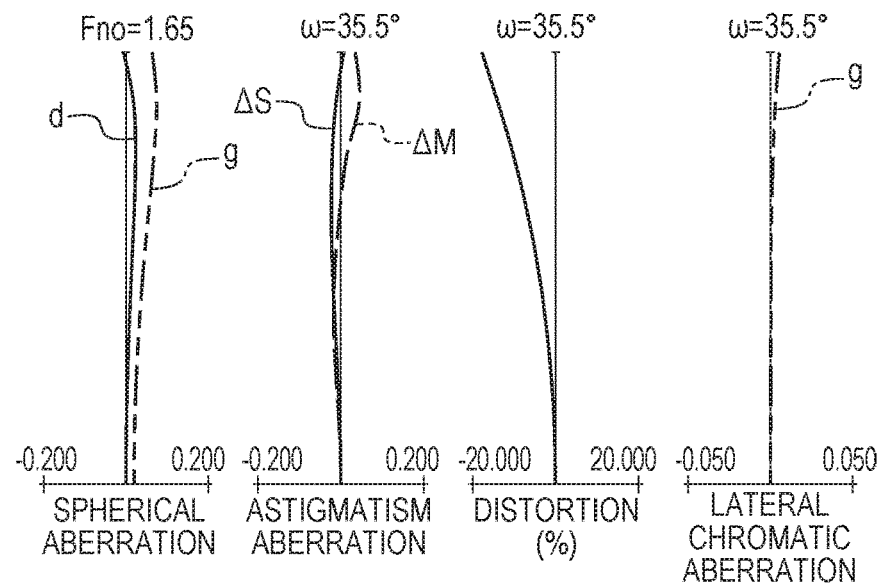
FIG. 8A is aberration diagrams of the zoom lens according to Example 4 at the wide angle end.
Figure 8B:
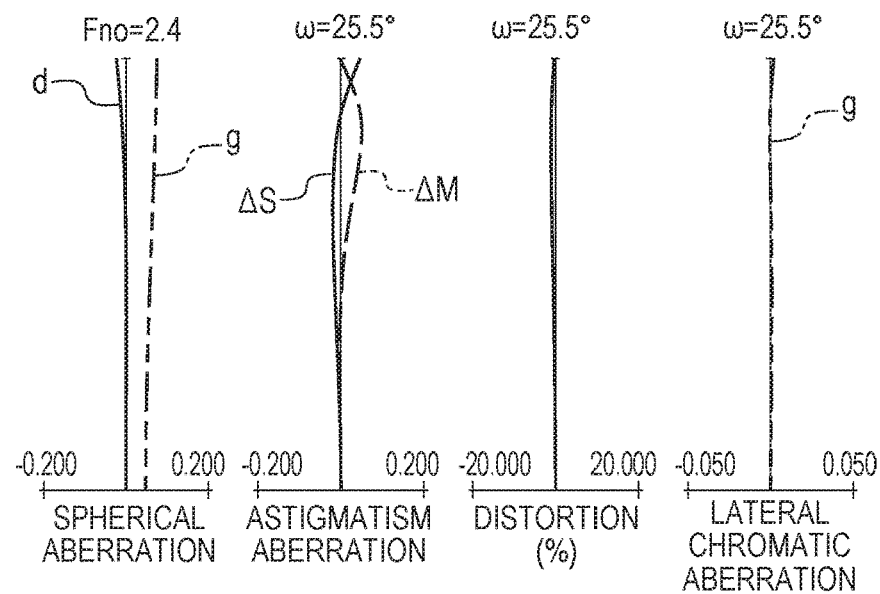
FIG. 8B is aberration diagrams of the zoom lens according to Example 4 at an intermediate position.
Figure 8C:
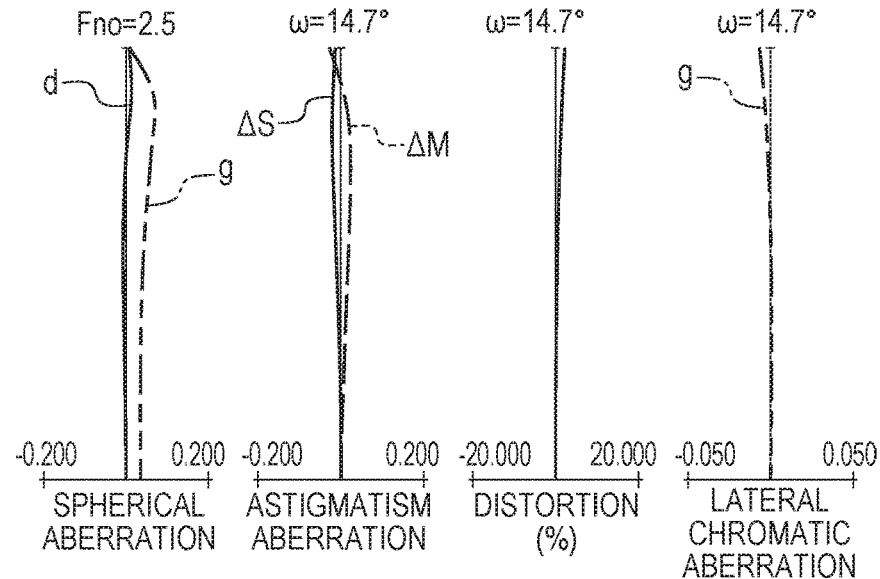
FIG. 8C is aberration diagrams of the zoom lens according to Example 4 at a telephoto end.

FIG. 7 is a lens cross-sectional view of a zoom lens according to Example 4 of the present invention at a wide angle end. FIG. 8A, FIG. 8B, and FIG. 8C are aberration diagrams of the zoom lens according to Example 4 at the wide angle end, at an intermediate zoom position, and at a telephoto end, respectively. Example 4 represents a zoom lens having a zoom ratio of 3.32 and an F-number of from 1.65 to 2.50.

Figure 9:
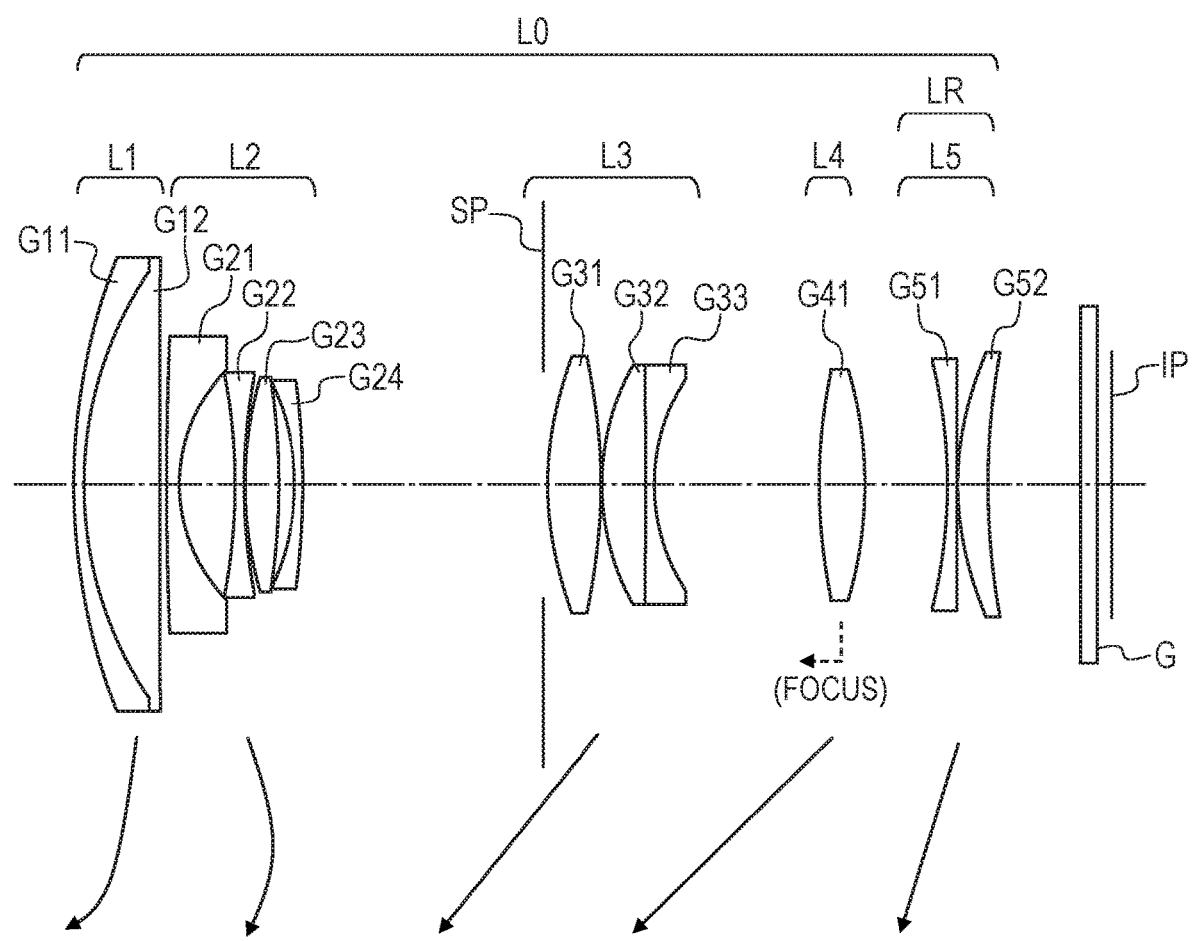
FIG. 9 is a lens cross-sectional view of a zoom lens according to Example 5 of the present invention at a wide angle end.
Figure 10A:
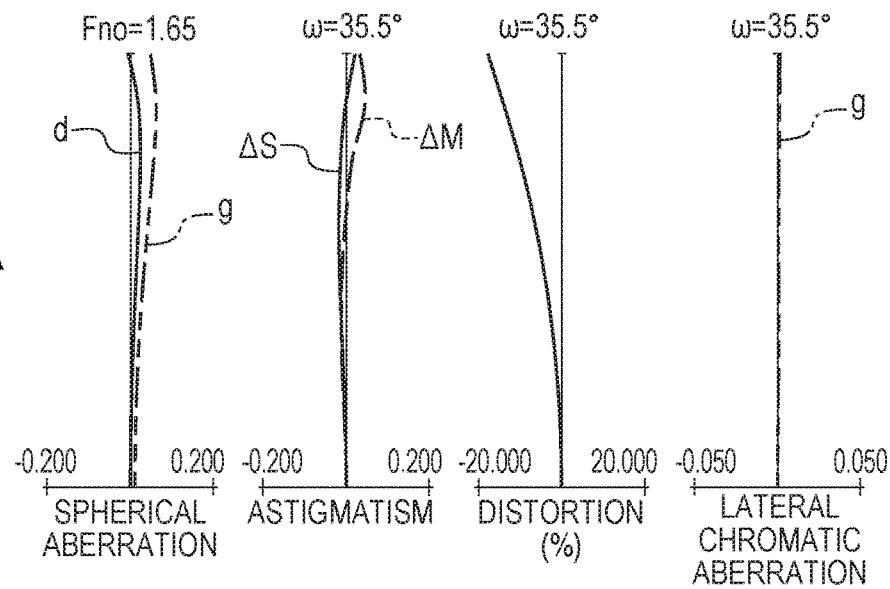
FIG. 10A is aberration diagrams of the zoom lens according to Example 5 at the wide angle end.
Figure 10B:
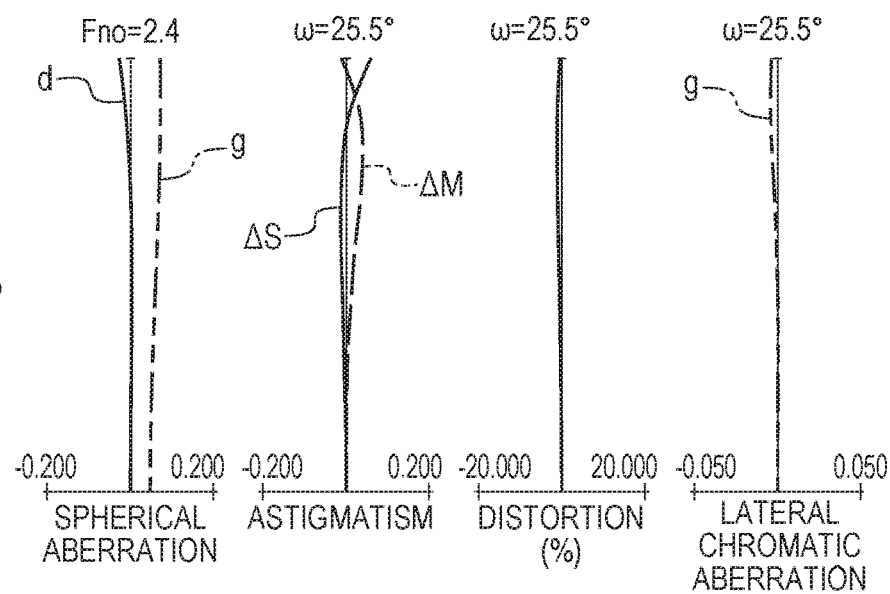
FIG. 10B is aberration diagrams of the zoom lens according to Example 5 at an intermediate position.
Figure 10C:
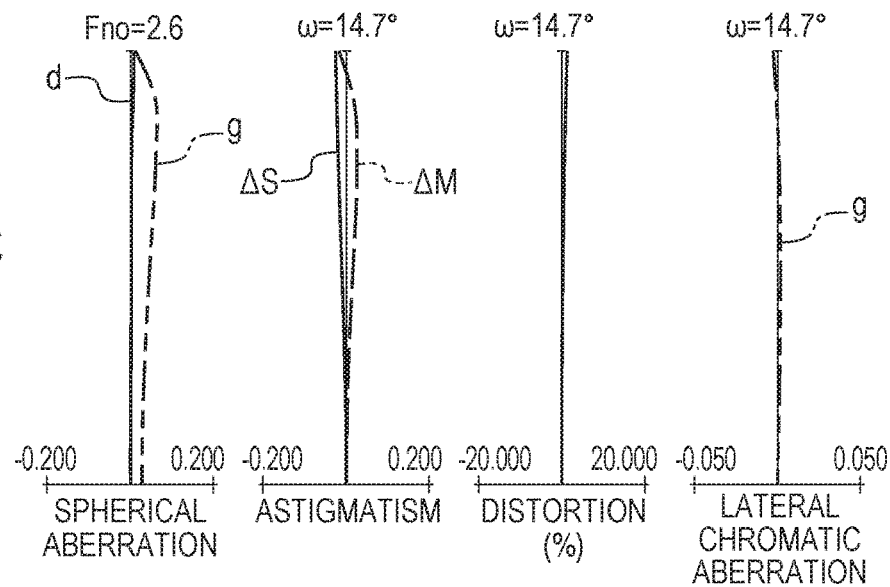
FIG. 10C is aberration diagrams of the zoom lens according to Example 5 at a telephoto end.

FIG. 9 is a lens cross-sectional view of a zoom lens according to Example 5 of the present invention at a wide angle end. FIG. 10A, FIG. 10B, and FIG. 10C are aberration diagrams of the zoom lens according to Example 5 at the wide angle end, at an intermediate zoom position, and at a telephoto end, respectively. Example 5 represents a zoom lens having a zoom ratio of 3.32 and an F-number of from 1.65 to 2.60.

Figure 11:
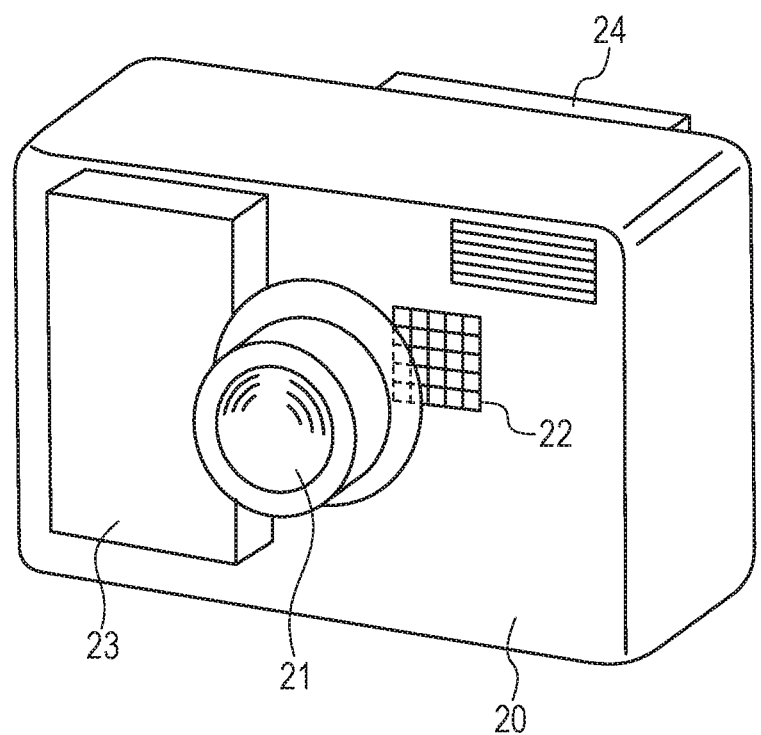
FIG. 11 is a schematic view of a main part of an image pickup apparatus.

FIG. 11 is a schematic view of a main part of an image pickup apparatus.

The zoom lens according to each Example is an image pickup optical system for use in image pickup apparatus such as a video camera, a digital camera, a television (TV) camera, and a monitoring camera. In the lens cross-sectional views, the left side is the object side (front), and the right side is the image side (rear). In the lens cross-sectional views, the order of a lens unit from the object side is represented by "i", and the i-th lens unit is represented by Li. A rear unit LR includes at least one lens unit.

In the lens cross-sectional views of Examples 1 and 2, there are illustrated a first lens unit L1 having a positive refractive power, a second lens unit L2 having a negative refractive power, a third lens unit L3 having a positive refractive power, a fourth lens unit L4 having a positive refractive power, a fifth lens unit L5 having a positive refractive power, and a sixth lens unit L6 having a negative refractive power. The rear unit LR consists of the fifth lens unit L5 and the sixth lens unit L6. Examples 1 and 2 represent a six-unit zoom lens.

In the lens cross-sectional view of Example 3, there are illustrated a first lens unit L1 having a positive refractive power, a second lens unit L2 having a negative refractive power, a third lens unit L3 having a positive refractive power, a fourth lens unit L4 having a positive refractive power, a fifth lens unit L5 having a positive refractive power, and a sixth lens unit L6 having a positive refractive power. The rear unit LR consists of the fifth lens unit L5 and the sixth lens unit L6. Example 3 represents a six-unit zoom lens.

In the lens cross-sectional view of Example 4, there are illustrated a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The rear unit LR consists of the fifth lens unit L5. Example 4 represents a five-unit zoom lens.

In the lens cross-sectional view of Example 5, there are illustrated a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. The rear unit LR consists of the fifth lens unit L5. Example 5 represents a five-unit zoom lens.

In each of the lens cross-sectional views, an aperture stop SP is arranged between the second lens unit L2 and the third lens unit L3. In each of the lens cross-sectional views, an optical element G corresponds to an optical filter, a face plate, a crystal low-pass filter, an infrared cut filter, or the like. An image plane IP is a solid-state image pickup element (photoelectric conversion element) such as a CCD sensor and a CMOS sensor when the zoom lens is used as an image pickup optical system of a video camera or a digital still camera.

The arrows indicate movement loci of the respective lens units during zooming from the wide angle end to the telephoto end. The arrow relating to focusing indicates a direction of movement of the lens unit during focusing from infinity to close distance.

In the spherical aberration diagrams among the aberration diagrams, a solid line "d" indicates a d-line (wavelength: 587.6 nm), and a long dashed double-short dashed line "g" indicates a g-line (wavelength: 435.8 nm). In the astigmatism diagrams, a dotted line ΔM indicates a meridional image plane at the d-line, and a solid line ΔS indicates a sagittal image plane at the d-line. The lateral chromatic aberration at the g-line is shown. Symbol "ω" represents a half angle of view (value of half of an image pickup angle of view) (degrees), and symbol Fno represents an F-number. In each Example, each lens unit is configured to move as indicated by the arrow during magnification varying from the wide angle end to the telephoto end.

Specifically, in Examples 1 to 3, the first lens unit L1 is configured to move toward the object side as indicated by the arrow during magnification varying from the wide angle end to the telephoto end. The second lens unit L2 is configured to move to draw a locus that is convex toward the image side. The third lens unit L3, the fourth lens unit L4, and the fifth lens unit L5 are configured to move toward the object side. The sixth lens unit L6 is configured to move toward the object side.

In Examples 1 to 3, during magnification varying, both of the first lens unit L1 and the third lens unit L3 are moved so as to be positioned closer to the object side at the telephoto end as compared to the wide angle end. In this manner, the total lens length at the wide angle end is reduced, and a high zoom ratio is obtained while an effective diameter of a front lens is reduced. In Examples 1 to 3, during zooming from the wide angle end to the telephoto end, the second lens unit L2 is moved so as to draw a locus that is convex toward the image side. In this manner, various aberrations such as a coma and a field curvature are satisfactorily corrected over the entire zoom range.

In Examples 1 to 3, during zooming from the wide angle end to the telephoto end, the fourth lens unit L4 and the fifth lens unit L5 are moved so as to be positioned closer to the object side at the telephoto end as compared to the wide angle end. With this movement, various aberrations such as a spherical aberration and a coma are satisfactorily corrected over the entire zoom range.

In Examples 1 to 3, during zooming from the wide angle end to the telephoto end, the sixth lens unit L6 is moved so as to be positioned closer to the object side at the telephoto end as compared to the wide angle end. In Examples 1 to 3, the fifth lens unit L5 is configured to move so as to correct an image plane variation accompanying the magnification varying and to perform focusing. The focusing from infinity to close distance is performed by moving the fifth lens unit L5 forward as indicated by the dotted-line arrow.

In Examples 4 and 5, the first lens unit L1 is configured to move toward the object side as indicated by the arrow during magnification varying from the wide angle end to the telephoto end. The second lens unit L2 is configured to move to draw a locus that is convex toward the image side. The third lens unit L3, the fourth lens unit L4, and the fifth lens unit L5 are configured to move toward the object side. In Examples 4 and 5, during magnification varying, both of the first lens unit L1 and the third lens unit L3 are moved so as to be positioned closer to the object side at the telephoto end as compared to the wide angle end. In this manner, the total lens length at the wide angle end is reduced, and a high zoom ratio is obtained while the effective diameter of the front lens is reduced.

In Examples 4 and 5, during zooming from the wide angle end to the telephoto end, the second lens unit L2 is moved so as to draw a locus that is convex toward the image side. In this manner, various aberrations such as a coma and a field curvature are satisfactorily corrected over the entire zoom range. In Examples 4 and 5, during zooming from the wide angle end to the telephoto end, the fourth lens unit L4 is moved so as to be positioned closer to the object side at the telephoto end as compared to the wide angle end. With this movement, various aberrations such as a spherical aberration and a coma are satisfactorily corrected over the entire zoom range.

Further, in Examples 4 and 5, the fifth lens unit L5 is configured to move so as to be positioned closer to the object side at the telephoto end as compared to the wide angle end. With this movement, a field curvature is satisfactorily corrected over the entire zoom range. In Examples 4 and 5, the fourth lens unit L4 is configured to move to correct the image plane variation accompanying the magnification varying and to perform focusing. The focusing from infinity to close distance is performed by moving the fourth lens unit L4 forward as indicated by the dotted-line arrow.

In each Example, focusing may be performed by, instead of moving the fourth lens unit L4 or the fifth lens unit L5, moving one or a plurality of other lens units.

In each Example, the first lens unit L1 consists of, in order from the object side to the image side, a negative lens and a positive lens. A focal length of the first lens unit L1 is represented by f1, a focal length of the second lens unit L2 is represented by f2, and a focal length of the third lens unit L3 is represented by f3. An average value of refractive indices at the d-line of respective materials of the negative lens and the positive lens of the first lens unit L1 is represented by Nd1ave. At this time, the following conditional expressions are satisfied.

$$-7.5 < f1/f2 < -4.8 \quad (1)$$

$$-4.0 < f3/f2 < -1.8 \quad (2)$$

$$1.86 < Nd1\text{ave} < 2.10 \quad (3)$$

Next, technical meanings of the above-mentioned conditional expressions are described. Conditional Expression (1) appropriately defines a ratio of the focal length of the first lens unit L1 to the focal length of the second lens unit L2 in order to downsize and thin the first lens unit L1 and the second lens unit L2. When the ratio exceeds the upper limit value of Conditional Expression (1) and the focal length of the first lens unit L1 becomes shorter, in order to sufficiently ensure an edge thickness of a positive lens included in the first lens unit L1, the thickness of the positive lens is required to be increased. As a result, it becomes difficult to thin the first lens unit L1. Further, it becomes difficult to correct the axial chromatic aberration and the lateral chromatic aberration at the telephoto end.

Moreover, when the ratio exceeds the upper limit value of Conditional Expression (1) and the negative focal length of the second lens unit L2 becomes longer (absolute value of the negative focal length becomes larger), it becomes difficult to reduce the total lens length at the wide angle end. As a result, it becomes difficult to reduce the lens diameters of the first lens unit L1 and the second lens unit L2.

When the ratio falls below the lower limit value of Conditional Expression (1) and the focal length of the first lens unit L1 becomes longer, it becomes difficult to reduce the total lens length at the telephoto end, and it becomes difficult to reduce the lens effective diameter of the first lens unit L1. Moreover, when the ratio falls below the lower limit value of Conditional Expression (1) and the negative focal length of the second lens unit L2 becomes shorter (absolute value of the negative focal length becomes smaller), it becomes difficult to thin the second lens unit L2. Further, it becomes difficult to correct various aberrations such as a coma, a field curvature, and a distortion at the wide angle end.

Conditional Expression (2) appropriately defines a ratio of the focal length of the third lens unit L3 to the focal length of the second lens unit L2 in order to thin the third lens unit L3 and reduce the total lens length at the wide angle end and at the telephoto end. When the ratio exceeds the upper limit value of Conditional Expression (2) and the focal length of the third lens unit L3 becomes shorter, in order to sufficiently ensure an edge thickness of a positive lens included in the third lens unit L3, the thickness of the positive lens is required to be increased. As a result, it becomes difficult to thin the third lens unit L3. Further, it becomes difficult to correct the spherical aberration and the coma over the entire zoom range.

When the ratio falls below the lower limit value of Conditional Expression (2) and the focal length of the third lens unit L3 becomes longer, it becomes difficult to reduce the total lens length at the wide angle end. Further, the amount of movement of the third lens unit L3 during zooming from the wide angle end to the telephoto end becomes too larger, and hence it becomes difficult to reduce the total lens length at the telephoto end.

Conditional Expression (3) appropriately defines the average value of the refractive indices at the d-line of the materials of the respective lenses used in the first lens unit L1 in order to downsize and thin the first lens unit L1. When the value exceeds the upper limit value of Conditional Expression (3) and the average value of the refractive indices at the d-line of the materials of the respective lenses used in the first lens unit L1 becomes larger, the Abbe number at the d-line becomes too smaller for the existing optical material. Therefore, it becomes difficult to correct the axial chromatic aberration and the lateral chromatic aberration over the entire zoom range.

When the value falls below the lower limit value of Conditional Expression (3) and the average value of the refractive indices at the d-line of the materials of the respective lenses used in the first lens unit L1 becomes smaller, in order to sufficiently ensure the edge thickness of the positive lens included in the first lens unit L1, the thickness of the positive lens is required to be increased. As a result, it becomes difficult to thin the first lens unit L1.

It is more preferred to set the numerical ranges of Conditional Expressions (1), (2), and (3) as follows.

$$-7.0 < f1/f2 < -4.9 \quad (1a)$$

$$-3.5 < f3/f2 < -1.9 \quad (2a)$$

$$1.88 < Nd1\text{ave} < 1.98 \quad (3a)$$

It is still more preferred to set the numerical ranges of Conditional Expressions (1a), (2a), and (3a) as follows.

$$-6.5 < f1/f2 < -5.0 \quad (1b)$$

$$-3.0 < f3/f2 < -2.0 \quad (2b)$$

$$1.89 < Nd1\text{ave} < 1.96 \quad (3b)$$

With the above-mentioned configuration, various aberrations are satisfactorily corrected while a larger aperture ratio and downsizing and thinning of the entire system of the zoom lens are achieved, and a zoom lens capable of obtaining high optical performance over the entire zoom range is achieved.

In each Example, it is more preferred to satisfy at least one of the following conditional expressions. A focal length of the fourth lens unit L4 is represented by f4. The third lens unit L3 includes at least one positive lens, and an average value of refractive indices at the d-line of the respective materials of the positive lenses included in the third lens unit L3 is represented by Nd3pave. A distance on the optical axis from a lens surface closest to the image side of the second lens unit L2 to a lens surface closest to the object side of the third lens unit L3 at the wide angle end is represented by D23w, and an amount of movement of the third lens unit L3 during zooming from the wide angle end to the telephoto end is represented by M3.

The amount of movement of the lens unit herein corresponds to a difference between the respective positions on the optical axis of the lens unit at the wide angle end and at the telephoto end. The sign of the amount of movement is positive when the lens unit is positioned closer to the object side at the telephoto end as compared to the wide angle end, and is negative when the lens unit is positioned closer to the image side at the telephoto end as compared to the wide angle end. A distance on the optical axis from a lens surface closest to the object side of the fourth lens unit L4 to a lens surface closest to the image side of the fourth lens unit L4 is represented by D4. A paraxial curvature radius of a lens surface closest to the image side of the first lens unit L1 is represented by rG12r, and a paraxial curvature radius of a lens surface closest to the object side of the second lens unit L2 is represented by rG21f.

The second lens unit L2 includes a negative lens G21 arranged closest to the object side, and a negative lens G22 arranged adjacent to the image side of the negative lens G21. A focal length of the negative lens G21 is represented by f21, and a focal length of the negative lens G22 is represented by f22. An F-number at the wide angle end is represented by Fnow. At this time, it is preferred to satisfy at least one of the following conditional expressions.

$$0.20 < f3/f4 < 1.00 \quad (4)$$

$$1.70 < Nd3\text{pave} < 1.90 \quad (5)$$

$$0.60 < D23w/M3 < 1.40 \quad (6)$$

$$0.01 < D4/f4 < 0.20 \quad (7)$$

$$0.0 < (rG12r + rG21f)/(rG12r - rG21f) < 2.5 \quad (8)$$

$$0.40 < f21/f22 < 1.00 \quad (9)$$

$$Fnow < 2.00 \quad (10)$$

Next, technical meanings of the above-mentioned conditional expressions are described. Conditional Expression (4) appropriately defines a ratio of the focal length of the third lens unit L3 to the focal length of the fourth lens unit L4 in order to reduce the total lens length at the wide angle end and at the telephoto end while downsizing and thinning the third lens unit L3. When the ratio exceeds the upper limit value of Conditional Expression (4) and the focal length of the third lens unit L3 becomes longer, it becomes difficult to reduce the total lens length at the wide angle end. Further, the amount of movement of the third lens unit L3 during zooming from the wide angle end to the telephoto end becomes too larger, and hence it becomes difficult to reduce the total lens length at the telephoto end.

When the ratio falls below the lower limit value of Conditional Expression (4) and the focal length of the third lens unit L3 becomes shorter, in order to sufficiently ensure an edge thickness of a positive lens included in the third lens unit L3, the thickness of the positive lens is required to be increased. As a result, it becomes difficult to thin the third lens unit L3. Further, it becomes difficult to correct the spherical aberration and the coma over the entire zoom range. Moreover, when the ratio falls below the lower limit value of Conditional Expression (4) and the focal length of the fourth lens unit L4 becomes longer, it becomes difficult to reduce the lens effective diameter of the third lens unit L3 and thin the third lens unit L3.

Conditional Expression (5) appropriately defines the average value of the refractive indices at the d-line of the respective materials of the positive lenses among the refractive indices at the d-line of the respective materials of the lenses included in the third lens unit L3 in order to thin the third lens unit L3 and satisfactorily correct the field curvature over the entire zoom range. When the value exceeds the upper limit value of Conditional Expression (5) and the average value of the refractive indices at the d-line of the respective materials of the positive lenses included in the third lens unit L3 becomes larger, the Abbe number at the d-line becomes too smaller for the existing material. Therefore, it becomes difficult to correct the axial chromatic aberration over the entire zoom range.

When the value falls below the lower limit value of Conditional Expression (5) and the average value of the refractive indices at the d-line of the respective materials of the positive lenses included in the third lens unit L3 becomes smaller, it becomes difficult to satisfactorily correct the field curvature over the entire zoom range. Further, in order to sufficiently ensure the edge thickness of the positive lens included in the third lens unit L3, the thickness of the positive lens is required to be increased. As a result, it becomes difficult to thin the third lens unit L3.

Conditional Expression (6) is given in order to reduce the total lens length at the wide angle end and at the telephoto end. Conditional Expression (6) appropriately defines a ratio of the distance on the optical axis from the lens surface closest to the image side of the second lens unit L2 to the lens surface closest to the object side of the third lens unit L3 to the amount of movement of the third lens unit L3 during zooming from the wide angle end to the telephoto end.

When the ratio exceeds the upper limit value of Conditional Expression (6) and the distance on the optical axis from the lens surface closest to the image side of the second lens unit L2 to the lens surface closest to the object side of the third lens unit L3 at the wide angle end becomes longer, it becomes difficult to reduce the total lens length at the wide angle end. When the ratio falls below the lower limit value of Conditional Expression (6) and the amount of movement of the third lens unit L3 during zooming from the wide angle end to the telephoto end becomes larger, it becomes difficult to reduce the total lens length at the telephoto end.

Conditional Expression (7) appropriately defines a ratio of the thickness of the fourth lens unit L4 (thickness of the lens unit) to the focal length of the fourth lens unit L4 in order to achieve thinning at the time when the lens barrel is retracted. When the ratio exceeds the upper limit value of Conditional Expression (7) and the focal length of the fourth lens unit L4 becomes shorter and the thickness of the fourth lens unit L4 becomes larger, it becomes difficult to achieve thinning at the time when the lens barrel is retracted. When the ratio falls below the lower limit value of Conditional Expression (7) and the focal length of the fourth lens unit L4 becomes longer, it becomes difficult to reduce the lens effective diameter of the third lens unit L3 and thin the third lens unit L3. As a result, it becomes difficult to achieve thinning at the time when the lens barrel is retracted.

Conditional Expression (8) appropriately defines the paraxial curvature radius of the lens surface closest to the image side of the first lens unit L1 and the paraxial curvature radius of the lens surface closest to the object side of the second lens unit L2 in order to satisfactorily correct the field curvature and the distortion at the wide angle end. When the ratio exceeds the upper limit value of Conditional Expression (8) and absolute values of refractive powers of the two lens surfaces become closer to each other, it becomes difficult to correct the distortion at the wide angle end. When the ratio falls below the lower limit value of Conditional Expression (8) and the absolute value of the refractive power of the lens surface closest to the image side of the first lens unit L1 becomes larger than the absolute value of the refractive power of the lens surface closest to the object side of the second lens unit L2, it becomes difficult to correct the field curvature at the wide angle end.

Conditional Expression (9) appropriately defines a ratio of the focal length of the negative lens G21 included in the second lens unit L2 to the focal length of the negative lens G22 arranged adjacent to the image side of the negative lens G21 in order to satisfactorily correct the coma, the field curvature, and the distortion on the wide angle side. When the ratio exceeds the upper limit value of Conditional Expression (9) and the focal length of the negative lens G21 becomes longer, it becomes difficult to correct the coma and the field curvature on the wide angle side. When the ratio falls below the lower limit value of Conditional Expression (9) and the focal length of the negative lens G21 becomes shorter, it becomes difficult to correct the distortion on the wide angle side.

Conditional Expression (10) appropriately defines the F-number at the wide angle end. When a bright optical system is formed so that the F-number does not exceed the upper limit value of Conditional Expression (10), a range of expression during photographing is expanded. In each Example, it is preferred to set the numerical ranges of Conditional Expressions (4) to (10) as follows.

$$0.35 < f3/f4 < 0.97 \quad (4a)$$

$$1.71 < Nd3pave < 1.85 \quad (5a)$$

$$0.70 < D23w/M3 < 1.30 \quad (6a)$$

$$0.03 < D4/f4 < 0.17 \quad (7a)$$

$$0.4 < (rG12r + rG21f)/(rG12r - rG21f) < 2.3 \quad (8a)$$

$$0.50 < f21/f22 < 0.90 \quad (9a)$$

$$Fnow < 1.85 \quad (10a)$$

Moreover, it is further preferred to set the numerical ranges of Conditional Expressions (4a) to (10a) as follows. With this, the effect represented by each of the conditional expressions described above can be maximally obtained.

$$0.50 < f3/f4 < 0.93 \quad (4b)$$

$$1.72 < Nd3pave < 1.80 \quad (5b)$$

$$0.75 < D23w/M3 < 1.20 \quad (6b)$$

$$0.04 < D4/f4 < 0.13 \quad (7b)$$

$$0.8 < (rG12r + rG21f)/(rG12r - rG21f) < 2.1 \quad (8b)$$

$$0.55 < f21/f22 < 0.85 \quad (9b)$$

$$Fnow < 1.70 \quad (10b)$$

Each element is configured as described above in each Example, and thus various aberrations are satisfactorily corrected while a larger aperture ratio and downsizing and thinning of the entire system of the zoom lens are achieved, and a zoom lens capable of having high optical performance over the entire zoom range is obtained.

In each Example, the third lens unit L3 having a positive refractive power may be configured to move so as to contain a component in a direction perpendicular to the optical axis in order to correct an image blur. With this, a blur of a photographed image, which occurs when the entire zoom lens is vibrated (tilted), can be satisfactorily corrected (image stabilization can be performed).

In each Example, the third lens unit L3 is configured to move so as contain a component in a direction perpendicular to the optical axis to perform image blur correction, but, for example, when complicated barrel structure is allowed, the third lens unit L3 may be rotated about the optical axis serving as a rotation center to perform image blur correction.

Further, the image blur correction may be performed with use of a part of lenses of the third lens unit L3. Further, the image blur correction may be performed with use of a lens unit other than the third lens unit L3 or a part of lenses of the lens unit. Still further, the image blur correction may be performed by simultaneously moving a plurality of lens units or a part of the plurality of lens units.

In each Example, in order to obtain high optical performance over the entire zoom range while downsizing the zoom lens, each lens unit is preferred to be configured as follows.

The first lens unit L1 is preferred to include, in order from the object side to the image side, two lenses of a negative lens G11 and a positive lens G12. The first lens unit L1 is more preferred to consist of the two lenses. When the first lens unit L1 is configured as described above, the axial chromatic aberration and the lateral chromatic aberration at the telephoto end can be corrected satisfactorily and easily while thinning of the first lens unit L1 is achieved.

The second lens unit L2 is preferred to include, in order from the object side to the image side, four lenses of the negative lens G21, the negative lens G22, a positive lens G23, and a negative lens G24. The second lens unit L2 is more preferred to consist of the four lenses. When the second lens unit L2 is configured as described above, for example, the coma, the field curvature, and the lateral chromatic aberration can be corrected satisfactorily and easily at the wide angle end and in a zoom range in the vicinity of the wide angle end.

The third lens unit L3 is preferred to include, in order from the object side to the image side, three lenses of a positive lens G31 and a cemented lens obtained by cementing a positive lens G32 and a negative lens G33. The third lens unit L3 is more preferred to consist of the three lenses. When the third lens unit L3 is configured as described above, the spherical aberration and the coma can be corrected satisfactorily and easily over the entire zoom range.

The fourth lens unit L4 is preferred to include one lens of a positive lens G41. The fourth lens unit L4 is more preferred to consist of the one lens. When the fourth lens unit L4 is configured as described above, the spherical aberration and the coma can be corrected satisfactorily and easily over the entire zoom range while thinning is achieved.

In Examples 1 to 3, the fifth lens unit L5 is preferred to include one lens of a positive lens G51. The fifth lens unit L5 is more preferred to consist of the one lens. When the fifth lens unit L5 is configured as described above, variations of various aberrations can be easily suppressed to be small when an object distance varies while thinning is achieved. In Examples 4 and 5, the fifth lens unit L5 is preferred to include two lenses of a negative lens G51 and a positive lens G52. The fifth lens unit L5 is more preferred to consist of the two lenses. When the fifth lens unit L5 is configured as described above, the field curvature can be corrected satisfactorily and easily over the entire zoom range.

In Examples 1 to 3, the sixth lens unit L6 is preferred to include two lenses of a negative lens G61 and a positive lens G62. The sixth lens unit L6 is more preferred to consist of the two lenses. When the sixth lens unit L6 is configured as described above, the field curvature can be corrected satisfactorily and easily over the entire zoom range.

According to each Example, with the above-mentioned configuration, it is possible to easily obtain the zoom lens in which the entire system of the zoom lens is downsized, a camera is thinned when the lens barrel is retracted, and high optical performance is obtained over the entire zoom range while the aperture ratio is increased.

In each Example, a configuration that assumes electronic aberration correction, which allows the distortion to some extent, may be employed. In this case, the effective diameter of the front lens can be reduced, and the entire system of the zoom lens can be easily downsized.

Next, a digital camera (image pickup apparatus) according to one embodiment of the present invention, which uses the zoom lens according to one of Examples of the present invention as an image pickup optical system, is described with reference to FIG. 11. In FIG. 11, the digital camera includes a digital camera main body 20, and an image pickup optical system 21 including the zoom lens of one of Examples described above. The digital camera further includes an image pickup element 22 (photoelectric conversion element), for example, a CCD, which is configured to receive light of an object image (image) formed by the image pickup optical system 21, a recording unit 23 configured to record data on the object image received by the image pickup element 22, and a finder 24 to be used to observe the object image displayed on a display element (not shown).

The display element includes a liquid crystal panel or the like. The object image formed on the image pickup element 22 is displayed on the display element. A compact image pickup apparatus having high optical performance can be implemented by applying the zoom lens according to one of Examples to the image pickup apparatus, for example, a digital camera, in such a manner.

Next, Numerical Data 1 to 5 corresponding to Examples 1 to 5, respectively, are described. In each of Numerical Data, symbol i represents the order of a surface counted from the object side, symbol ri represents a curvature radius of an i-th lens surface, symbol di represents a lens thickness or an air gap between an i-th surface and the (i+1)th surface, and symbols ndi and vdi represent a refractive index and an Abbe number of a lens between the i-th surface and the (i+1)th surface at the d-line, respectively.

Further, an aspherical shape is represented as follows:

$$x=(h^2/R)/[1+[1-(1+k)(h/R)^2]^{1/2}]+A4h^4+A6h^6+A8h^8,$$

where "k" represents an eccentricity, A4, A6, and A8 represent aspherical coefficients, "x" represents a displacement in the optical axis direction with respect to a surface vertex at a position of a height "h" from the optical axis, and R represents a paraxial curvature radius. In each of Numerical Data, the last two surfaces are surfaces of an optical block such as a filter or a face plate.

In each of Examples, back focus (BF) corresponds to a distance from a lens final surface to a paraxial image plane, and the distance is represented by an air-equivalent length. A total lens length is obtained by adding the back focus to a distance from a lens surface closest to the object side to the final lens surface. Moreover, correspondence between each of Examples and the conditional expressions given above is shown in Table 1.

Numerical Data 1

Unit: mm
Surface data

| Surface number | r | d | nd | vd |
|---|---|---|---|---|
| 1 | 39.372 | 0.90 | 1.98738 | 16.4 |
| 2 | 25.087 | 4.05 | 1.88300 | 40.8 |
| 3 | 489.577 | (Variable) | | |
| 4 | 50.816 | 0.75 | 1.85135 | 40.1 |
| 5* | 9.801 | 4.05 | | |
| 6 | −21.209 | 0.55 | 1.88300 | 40.8 |
| 7 | 65.350 | 0.05 | | |
| 8 | 29.204 | 1.95 | 2.00272 | 19.3 |
| 9 | −30.432 | 0.70 | | |
| 10 | −14.786 | 0.50 | 1.80400 | 46.6 |
| 11 | −170.404 | (Variable) | | |
| 12 (Stop) | ∞ | 0.25 | | |
| 13* | 19.204 | 3.00 | 1.76802 | 49.2 |
| 14* | −34.229 | 0.05 | | |
| 15 | 15.697 | 2.45 | 1.77250 | 49.6 |
| 16 | −802.587 | 0.50 | 1.85478 | 24.8 |
| 17 | 11.886 | (Variable) | | |
| 18 | 21.899 | 2.35 | 1.59282 | 68.6 |
| 19 | −63.849 | (Variable) | | |
| 20 | 77.840 | 1.80 | 1.55332 | 71.7 |
| 21* | −36.781 | (Variable) | | |
| 22 | −53.199 | 0.55 | 1.89286 | 20.4 |
| 23 | 54.967 | 0.05 | | |
| 24* | 14.199 | 1.60 | 1.76802 | 49.2 |
| 25 | 21.261 | (Variable) | | |
| 26 | ∞ | 1.00 | 1.51633 | 64.1 |
| 27 | ∞ | 0.88 | | |
| Image plane | ∞ | | | |

Aspherical surface data

Fifth surface

K = 0.00000e+000 A4 = 2.32688e−006 A6 = 9.59835e−008
A8 = 3.12157e−009

Thirteenth surface

K = 0.00000e+000 A4 = −2.90991e−005 A6 = 5.05408e−008

Fourteenth surface

K = 0.00000e+000 A4 = 3.07821e−005 A6 = −4.67600e−009

Twenty-first surface

K = 0.00000e+000 A4 = 3.04860e−005 A6 = 2.12116e−007
A8 = −3.73039e−010

Twenty-fourth surface

K = 0.00000e+000 A4 = −5.65313e−005 A6 = 7.35204e−008
A8 = −1.14484e−009

Various data

Zoom ratio 3.32

| | Wide angle | Intermediate | Telephoto |
|---|---|---|---|
| Focal length | 9.06 | 16.51 | 30.07 |
| F-number | 1.65 | 2.30 | 2.47 |
| Half angle of view (degrees) | 35.55 | 25.54 | 14.70 |
| Image height | 6.47 | 7.89 | 7.89 |
| Total lens length | 62.56 | 66.50 | 75.79 |
| BF | 6.66 | 10.97 | 13.37 |
| d3 | 0.40 | 5.93 | 13.02 |
| d11 | 12.66 | 5.13 | 0.60 |
| d17 | 10.20 | 8.64 | 7.51 |
| d19 | 3.87 | 5.64 | 6.78 |
| d21 | 2.68 | 4.08 | 8.41 |
| d25 | 5.12 | 9.43 | 11.83 |

Zoom lens unit data

| Unit | First surface | Focal length |
|---|---|---|
| 1 | 1 | 51.91 |
| 2 | 4 | −8.32 |
| 3 | 12 | 19.08 |
| 4 | 18 | 27.79 |
| 5 | 20 | 45.40 |
| 6 | 22 | −69.81 |

Second lens unit data

| Lens | First surface | Focal length |
|---|---|---|
| G21 | 4 | −14.38 |
| G22 | 6 | −18.08 |

Numerical Data 2

Unit: mm
Surface data

| Surface number | r | d | nd | vd |
|---|---|---|---|---|
| 1 | 30.548 | 0.90 | 1.95906 | 17.5 |
| 2 | 20.972 | 4.70 | 1.88300 | 40.8 |
| 3 | 151.994 | (Variable) | | |
| 4 | 49.372 | 0.75 | 1.85135 | 40.1 |
| 5* | 8.655 | 4.00 | | |
| 6 | −27.602 | 0.55 | 1.88300 | 40.8 |
| 7 | 28.418 | 0.05 | | |

-continued

| | | | | |
|---|---|---|---|---|
| 8 | 21.126 | 1.90 | 1.89286 | 20.4 |
| 9 | −49.015 | 1.10 | | |
| 10 | −13.190 | 0.50 | 1.88300 | 40.8 |
| 11 | −26.015 | (Variable) | | |
| 12 (Stop) | ∞ | 0.25 | | |
| 13* | 15.611 | 3.35 | 1.85135 | 40.1 |
| 14* | −40.367 | 0.05 | | |
| 15 | 19.822 | 2.25 | 1.59282 | 68.6 |
| 16 | −130.985 | 0.45 | 1.85478 | 24.8 |
| 17 | 11.816 | (Variable) | | |
| 18 | 68.218 | 2.62 | 1.65160 | 58.5 |
| 19 | −19.995 | (Variable) | | |
| 20* | 34.953 | 2.00 | 1.49710 | 81.6 |
| 21 | −150.476 | (Variable) | | |
| 22 | −49.152 | 0.55 | 1.89286 | 20.4 |
| 23 | 20.822 | 0.10 | | |
| 24* | 15.136 | 3.10 | 1.85135 | 40.1 |
| 25 | 265.261 | (Variable) | | |
| 26 | ∞ | 1.00 | 1.51633 | 64.1 |
| 27 | ∞ | 0.88 | | |
| Image plane | ∞ | | | |

Aspherical surface data

Fifth surface $K = 0.00000\text{e}+000\ A4 = -2.43836\text{e}-005\ A6 = 2.50391\text{e}-007$
$A8 = -7.76861\text{e}-009$ Thirteenth surface $K = 0.00000\text{e}+000\ A4 = -3.99881\text{e}-005\ A6 = 2.05742\text{e}-007$
$A8 = -2.32036\text{e}-009$ Fourteenth surface $K = 0.00000\text{e}+000\ A4 = 5.75784\text{e}-005\ A6 = 3.95647\text{e}-008$
$A8 = -1.91424\text{e}-009$ Twentieth surface $K = 0.00000\text{e}+000\ A4 = 1.17038\text{e}-006\ A6 = -1.22147\text{e}-008$
$A8 = 1.04647\text{e}-010$ Twenty-fourth surface $K = 0.00000\text{e}+000\ A4 = -5.49448\text{e}-005\ A6 = 1.69766\text{e}-007$
$A8 = -1.57534\text{e}-009$ Various data Zoom ratio 3.32

| | Wide angle | Intermediate | Telephoto |
|---|---|---|---|
| Focal length | 9.06 | 16.51 | 30.07 |
| F-number | 1.65 | 2.30 | 2.47 |
| Half angle of view (degrees) | 36.48 | 25.54 | 14.70 |
| Image height | 6.70 | 7.89 | 7.89 |
| Total lens length | 63.80 | 66.03 | 79.50 |
| BF | 5.57 | 4.57 | 6.07 |
| d3 | 0.40 | 2.24 | 11.68 |
| d11 | 12.43 | 3.99 | 0.60 |
| d17 | 6.56 | 5.79 | 6.97 |
| d19 | 5.37 | 7.95 | 10.01 |
| d21 | 4.31 | 12.33 | 15.00 |
| d25 | 4.03 | 3.03 | 4.53 |

Zoom lens unit data

| Unit | First surface | Focal length |
|---|---|---|
| 1 | 1 | 44.45 |
| 2 | 4 | −7.69 |
| 3 | 12 | 21.77 |
| 4 | 18 | 24.01 |
| 5 | 20 | 57.26 |
| 6 | 22 | −130.62 |

Second lens unit data

| Lens | First surface | Focal length |
|---|---|---|
| G21 | 4 | −12.43 |
| G22 | 6 | −15.78 |

Numerical Data 3

Unit: mm
Surface data

| Surface number | r | d | nd | vd |
|---|---|---|---|---|
| 1 | 31.192 | 0.70 | 1.98738 | 16.4 |
| 2 | 22.438 | 4.40 | 1.80139 | 45.5 |
| 3* | 357.283 | (Variable) | | |
| 4 | 45.306 | 0.60 | 1.85135 | 40.1 |
| 5* | 8.785 | 4.45 | | |
| 6 | −19.311 | 0.45 | 1.83481 | 42.7 |
| 7 | 63.061 | 0.05 | | |
| 8 | 27.583 | 1.90 | 2.00272 | 19.3 |
| 9 | −32.364 | 0.85 | | |
| 10 | −13.705 | 0.40 | 1.80400 | 46.6 |
| 11 | −55.531 | (Variable) | | |
| 12 (Stop) | ∞ | 0.25 | | |
| 13* | 17.673 | 3.10 | 1.76802 | 49.2 |
| 14* | −35.987 | 0.05 | | |
| 15 | 16.538 | 2.45 | 1.77250 | 49.6 |
| 16 | −267.485 | 0.50 | 1.85478 | 24.8 |
| 17 | 11.747 | (Variable) | | |
| 18 | 28.260 | 2.00 | 1.59282 | 68.6 |
| 19 | −62.418 | (Variable) | | |
| 20 | 241.562 | 1.60 | 1.59201 | 67.0 |
| 21* | −39.107 | (Variable) | | |
| 22 | −60.711 | 0.55 | 1.89286 | 20.4 |
| 23 | 61.094 | 0.05 | | |
| 24* | 15.973 | 2.20 | 1.76802 | 49.2 |
| 25 | 42.476 | (Variable) | | |
| 26 | ∞ | 1.00 | 1.51633 | 64.1 |
| 27 | ∞ | 0.88 | | |
| Image plane | ∞ | | | |

Aspherical surface data

Third surface $K = 0.00000\text{e}+000\ A4 = -3.48410\text{e}-007\ A6 = 4.26662\text{e}-009$
$A8 = -8.01526\text{e}-012$ Fifth surface $K = 0.00000\text{e}+000\ A4 = -1.27466\text{e}-005\ A6 = -2.09736\text{e}-007$
$A8 = -2.72685\text{e}-009$ Thirteenth surface $K = 0.00000\text{e}+000\ A4 = -3.00819\text{e}-005\ A6 = -1.35667\text{e}-007$
$A8 = 2.21571\text{e}-009$ Fourteenth surface $K = 0.00000\text{e}+000\ A4 = 3.77114\text{e}-005\ A6 = -2.02472\text{e}-007$
$A8 = 2.36473\text{e}-009$ Twenty-first surface $K = 0.00000\text{e}+000\ A4 = 1.47990\text{e}-005\ A6 = 1.90732\text{e}-007$
$A8 = -3.40402\text{e}-010$ Twenty-fourth surface $K = 0.00000\text{e}+000\ A4 = -5.12650\text{e}-005\ A6 = 1.93088\text{e}-007$
$A8 = -9.34658\text{e}-010$ -continued

Various data

Zoom ratio 3.86

|  | Wide angle | Intermediate | Telephoto |
|---|---|---|---|
| Focal length | 9.06 | 17.81 | 35.00 |
| F-number | 1.65 | 2.30 | 2.68 |
| Half angle of view (degrees) | 36.48 | 23.89 | 12.70 |
| Image height | 6.70 | 7.89 | 7.89 |
| Total lens length | 62.74 | 67.26 | 79.56 |
| BF | 6.20 | 11.02 | 13.74 |
| d3 | 0.40 | 6.43 | 13.85 |
| d11 | 12.80 | 5.07 | 0.60 |
| d17 | 7.86 | 5.41 | 5.54 |
| d19 | 4.63 | 6.68 | 7.06 |
| d21 | 4.30 | 6.11 | 12.22 |
| d25 | 4.66 | 9.48 | 12.20 |

Zoom lens unit data

| Unit | First surface | Focal length |
|---|---|---|
| 1 | 1 | 46.80 |
| 2 | 4 | −8.02 |
| 3 | 12 | 19.34 |
| 4 | 18 | 33.09 |
| 5 | 20 | 56.97 |
| 6 | 22 | 820.88 |

Second lens unit data

| Lens | First surface | Focal length |
|---|---|---|
| G21 | 4 | −12.90 |
| G22 | 6 | −17.67 |

Numerical Data 4

Unit: mm
Surface data

| Surface number | r | d | nd | νd |
|---|---|---|---|---|
| 1 | 34.586 | 0.60 | 1.98738 | 16.4 |
| 2 | 22.263 | 4.50 | 1.88300 | 40.8 |
| 3 | 1,048.917 | (Variable) | | |
| 4 | 257.222 | 0.75 | 1.85135 | 40.1 |
| 5* | 9.327 | 3.40 | | |
| 6 | −28.884 | 0.55 | 1.88300 | 40.8 |
| 7 | 36.103 | 0.05 | | |
| 8 | 24.302 | 2.00 | 2.00272 | 19.3 |
| 9 | −40.801 | 1.00 | | |
| 10 | −13.871 | 0.50 | 1.80400 | 46.6 |
| 11 | −30.371 | (Variable) | | |
| 12 (Stop) | ∞ | 0.25 | | |
| 13* | 19.946 | 3.20 | 1.76802 | 49.2 |
| 14* | −32.766 | 0.05 | | |
| 15 | 13.536 | 2.60 | 1.77250 | 49.6 |
| 16 | 297.495 | 0.50 | 1.85478 | 24.8 |
| 17 | 10.727 | (Variable) | | |
| 18* | 38.566 | 2.40 | 1.61881 | 63.9 |
| 19 | −26.484 | (Variable) | | |
| 20 | −33.707 | 0.55 | 1.89286 | 20.4 |
| 21 | 265.709 | 0.05 | | |
| 22* | 19.151 | 2.20 | 1.76802 | 49.2 |
| 23 | 135.431 | (Variable) | | |
| 24 | ∞ | 1.00 | 1.51633 | 64.1 |
| 25 | ∞ | 0.88 | | |
| Image plane | ∞ | | | |

-continued

Aspherical surface data

Fifth surface

K = 0.00000e+000 A4 = −2.72355e−005 A6 = 1.29328e−007
A8 = −5.67933e−009

Thirteenth surface

K = 0.00000e+000 A4 = −2.46696e−005 A6 = −2.86050e−008
A8 = −6.37085e−011

Fourteenth surface

K = 0.00000e+000 A4 = 3.33428e−005 A6 = −9.06149e−008

Eighteenth surface

K = 0.00000e+000 A4 = 2.92096e−006 A6 = −8.27032e−008
A8 = −4.32319e−010

Twenty-second surface

K = 0.00000e+000 A4 = −5.68034e−005 A6 = 1.65907e−007
A8 = −1.06264e−009

Various data

Zoom ratio 3.32

|  | Wide angle | Intermediate | Telephoto |
|---|---|---|---|
| Focal length | 9.06 | 16.51 | 30.07 |
| F-number | 1.65 | 2.40 | 2.50 |
| Half angle of view (degrees) | 35.53 | 25.54 | 14.70 |
| Image height | 6.47 | 7.89 | 7.89 |
| Total lens length | 61.71 | 64.51 | 72.08 |
| BF | 7.79 | 11.58 | 14.28 |
| d3 | 0.40 | 5.66 | 9.96 |
| d11 | 14.01 | 5.90 | 0.60 |
| d17 | 9.83 | 9.06 | 8.24 |
| d19 | 4.53 | 7.17 | 13.86 |
| d23 | 6.25 | 10.04 | 12.74 |

Zoom lens unit data

| Unit | First surface | Focal length |
|---|---|---|
| 1 | 1 | 43.26 |
| 2 | 4 | −8.64 |
| 3 | 12 | 18.11 |
| 4 | 18 | 25.74 |
| 5 | 20 | 202.05 |

Second lens unit data

| Lens | First surface | Focal length |
|---|---|---|
| G21 | 4 | −11.38 |
| G22 | 6 | −18.10 |

Numerical Data 5

Unit: mm
Surface data

| Surface number | r | d | nd | νd |
|---|---|---|---|---|
| 1 | 36.992 | 0.60 | 1.98738 | 16.4 |
| 2 | 22.839 | 4.50 | 1.88300 | 40.8 |
| 3 | 5,291.757 | (Variable) | | |
| 4 | 209.030 | 0.75 | 1.85135 | 40.1 |
| 5* | 9.635 | 3.30 | | |
| 6 | −35.322 | 0.55 | 1.88300 | 40.8 |
| 7 | 35.540 | 0.05 | | |
| 8 | 23.232 | 2.00 | 2.00272 | 19.3 |
| 9 | −41.740 | 0.95 | | |
| 10 | −14.319 | 0.50 | 1.80400 | 46.6 |
| 11 | −48.328 | (Variable) | | |
| 12 (Stop) | ∞ | 0.25 | | |

| | | | | |
|---|---|---|---|---|
| 13* | 19.607 | 3.20 | 1.76802 | 49.2 |
| 14* | −31.640 | 0.05 | | |
| 15 | 14.658 | 2.60 | 1.77250 | 49.6 |
| 16 | −443.648 | 0.50 | 1.85478 | 24.8 |
| 17 | 11.538 | (Variable) | | |
| 18* | 32.410 | 2.70 | 1.59282 | 68.6 |
| 19 | −24.374 | (Variable) | | |
| 20 | −30.305 | 0.55 | 1.89286 | 20.4 |
| 21 | 5,638.925 | 0.05 | | |
| 22* | 17.367 | 1.80 | 1.76802 | 49.2 |
| 23 | 43.577 | (Variable) | | |
| 24 | ∞ | 1.00 | 1.51633 | 64.1 |
| 25 | ∞ | 0.88 | | |
| Image plane | ∞ | | | |

Aspherical surface data

Fifth surface

K = 0.00000e+000 A4 = −2.01239e−005 A6 = 9.52824e−008
A8 = −4.74578e−009

Thirteenth surface

K = 0.00000e+000 A4 = −2.70955e−005 A6 = −8.12564e−008
A8 = −1.55018e−010

Fourteenth surface

K = 0.00000e+000 A4 = 3.53815e−005 A6 = −1.52994e−007

Eighteenth surface

K = 0.00000e+000 A4 = −5.60280e−006 A6 = −1.46959e−007
A8 = −1.62262e−010

Twenty-second surface

K = 0.00000e+000 A4 = −6.21286e−005 A6 = 1.86192e−007
A8 = −9.93888e−010

| Zoom ratio | 3.32 | | |
|---|---|---|---|
| | Wide angle | Intermediate | Telephoto |
| Focal length | 9.05 | 16.51 | 30.07 |
| F-number | 1.65 | 2.40 | 2.60 |
| Half angle of view (degrees) | 35.55 | 25.54 | 14.70 |
| | 6.47 | 7.89 | 7.89 |
| Total lens length | 61.29 | 64.08 | 70.44 |
| BF | 7.00 | 10.82 | 13.71 |
| d3 | 0.40 | 5.72 | 8.88 |
| d11 | 14.27 | 6.22 | 0.60 |
| d17 | 9.78 | 9.06 | 7.69 |
| d19 | 4.94 | 7.37 | 14.67 |
| d23 | 5.47 | 9.28 | 12.17 |

Zoom lens unit data

| Unit | First surface | Focal length |
|---|---|---|
| 1 | 1 | 45.45 |
| 2 | 4 | −8.69 |
| 3 | 12 | 17.86 |
| 4 | 18 | 23.89 |
| 5 | 20 | −402.05 |

Second lens unit data

| Lens | First surface | Focal length |
|---|---|---|
| G21 | 4 | −11.88 |
| G22 | 6 | −19.99 |

TABLE 1

| | Example | | | | |
|---|---|---|---|---|---|
| Conditional Expression | 1 | 2 | 3 | 4 | 5 |
| (1) −7.5 < f1/f2 < −4.8 | −6.237 | −5.777 | −5.832 | −5.009 | −5.231 |
| (2) −4.0 < f3/f2 < −1.8 | −2.293 | −2.829 | −2.410 | −2.097 | −2.055 |
| (3) 1.86 < Nd1ave < 2.10 | 1.935 | 1.921 | 1.894 | 1.935 | 1.935 |
| (4) 0.20 < f3/f4 < 1.00 | 0.687 | 0.907 | 0.585 | 0.704 | 0.748 |
| (5) 1.70 < Nd3pave < 1.90 | 1.770 | 1.722 | 1.770 | 1.770 | 1.770 |
| (6) 0.60 < D23w/M3 < 1.40 | 1.019 | 0.781 | 0.838 | 1.003 | 1.013 |
| (7) 0.01 < D4/f4 < 0.20 | 0.085 | 0.109 | 0.060 | 0.093 | 0.113 |
| (8) 0.0 < (rG12r + rG21f)/(rG12r − rG21f) < 2.5 | 1.232 | 1.962 | 1.290 | 1.650 | 1.082 |
| (9) 0.40 < f21/f22 < 1.00 | 0.796 | 0.788 | 0.730 | 0.629 | 0.595 |
| (10) Fnow < 2.00 | 1.648 | 1.648 | 1.648 | 1.648 | 1.648 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-121092, filed Jun. 21, 2017, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power;
a fourth lens unit having a positive refractive power; and
a rear unit including at least one lens unit,
wherein an interval between each pair of adjacent lens units is changed during zooming,
wherein the first lens unit includes, in order from the object side to the image side, a negative lens and a positive lens, and
wherein the following conditional expressions are satisfied:

$$-7.5 < f1/f2 < -4.9[[-4.8]],$$

$$-4.0 < f3/f2 < -1.8; \text{ and}$$

$$1.86 < Nd1\text{ave} < 2.10,$$

where f1 represents a focal length of the first lens unit, f2 represents a focal length of the second lens unit, f3 represents a focal length of the third lens unit, and Nd1ave represents an average value of refractive indices at a d-line of all lenses included in the first lens unit.

2. A zoom lens according to claim 1, wherein the following conditional expression is satisfied:

$$0.20 < f3/f4 < 1.00,$$

where f4 represents a focal length of the fourth lens unit.

3. A zoom lens according to claim 1,
wherein the third lens unit includes at least one positive lens, and
wherein the following conditional expression is satisfied:

$$1.70 < Nd3p\text{ave} < 1.90,$$

where Nd3pave represents an average value of refractive indices at the d-line of all of the at least one positive lens included in the third lens unit.

4. A zoom lens according to claim 1, wherein the following conditional expression is satisfied:

$$0.60 < D23w/M3 < 1.40,$$

where D23w represents a distance on an optical axis from a lens surface closest to the image side of the second lens unit to a lens surface closest to the object side of the third lens unit at a wide angle end, and M3 represents an amount of movement of the third lens unit during zooming from the wide angle end to a telephoto end, and
wherein a sign of the amount of movement is positive when the third lens unit is positioned closer to the object side at the telephoto end as compared to the wide angle end, and the sign of the amount of movement is negative when the third lens unit is positioned closer to the image side at the telephoto end as compared to the wide angle end.

5. A zoom lens according to claim 1, wherein the following conditional expression is satisfied:

$$0.01 < D4/f4 < 0.20,$$

where D4 represents a distance on an optical axis from a lens surface closest to the object side of the fourth lens unit to a lens surface closest to the image side of the fourth lens unit, and f4 represents a focal length of the fourth lens unit.

6. A zoom lens according to claim 1, wherein the following conditional expression is satisfied:

$$0.0 < (rG12r+rG21f)/(rG12r-rG21f) < 2.5,$$

where rG12r represents a paraxial curvature radius of a lens surface closest to the image side of the first lens unit, and rG21f represents a paraxial curvature radius of a lens surface closest to the object side of the second lens unit.

7. A zoom lens according to claim 1,
wherein the second lens unit includes a negative lens G21 arranged closest to the object side, and a negative lens G22 arranged adjacent to the image side of the negative lens G21, and
wherein the following conditional expression is satisfied:

$$0.40 < f21/f22 < 1.00,$$

where f21 represents a focal length of the negative lens G21, and f22 represents a focal length of the negative lens G22.

8. A zoom lens according to claim 1, wherein the following conditional expression is satisfied:

$$Fnow < 2.00,$$

where Fnow represents an F-number at a wide angle end.

9. A zoom lens according to claim 1, wherein the rear unit consists of a fifth lens unit having a positive refractive power.

10. A zoom lens according to claim 1, wherein the rear unit consists of, in order from the object side to the image side, a fifth lens unit having a positive refractive power, and a sixth lens unit having a negative refractive power.

11. A zoom lens according to claim 1, wherein the rear unit consists of, in order from the object side to the image side, a fifth lens unit having a positive refractive power, and a sixth lens unit having a positive refractive power.

12. A zoom lens according to claim 1, wherein the first lens unit consists of the negative lens and the positive lens.

13. A zoom lens according to claim 1, wherein the following conditional expression is satisfied:

$$-7.5 < f1/f2 < -5.0.$$

14. An image pickup apparatus comprising:
a zoom lens; and
an image pickup element configured to receive light of an image formed by the zoom lens,
wherein the zoom lens includes, in order from an object side to an image side:
a first lens unit having a positive refractive power;
a second lens unit having a negative refractive power;
a third lens unit having a positive refractive power;
a fourth lens unit having a positive refractive power; and
a rear unit including at least one lens unit,
wherein an interval between each pair of adjacent lens units is changed during zooming,
wherein the first lens unit includes, in order from the object side to the image side, a negative lens and a positive lens, and wherein the following conditional expressions are satisfied:

$-7.5 < f1/f2 < [[-4.8]] -4.9;$ $-4.0 < f3/f2 < -1.8;$ and $1.86 < Nd1ave < 2.10,$ where f1 represents a focal length of the first lens unit, f2 represents a focal length of the second lens unit, f3 represents a focal length of the third lens unit, and Nd1ave represents an average value of refractive indices at a d-line of all lenses included in the first lens unit.

\* \* \* \* \*